United States Patent
Kuang et al.

(10) Patent No.: US 11,871,349 B2
(45) Date of Patent: Jan. 9, 2024

(54) SLEEP METHOD FOR TERMINAL DEVICE AND APPARATUS

(71) Applicant: HUAWEI TECHNOLOGIES CO., LTD., Guangdong (CN)

(72) Inventors: Yiru Kuang, Beijing (CN); Yu Cai, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 382 days.

(21) Appl. No.: 17/266,721

(22) PCT Filed: Feb. 14, 2019

(86) PCT No.: PCT/CN2019/075084
§ 371 (c)(1),
(2) Date: Feb. 8, 2021

(87) PCT Pub. No.: WO2020/029568
PCT Pub. Date: Feb. 13, 2020

(65) Prior Publication Data
US 2021/0306952 A1    Sep. 30, 2021

(30) Foreign Application Priority Data

Aug. 9, 2018 (CN) .......................... 201810902746.X
Sep. 7, 2018 (CN) .......................... 201811044304.2

(51) Int. Cl.
*H04W 52/02*    (2009.01)
*H04W 76/28*    (2018.01)
(Continued)

(52) U.S. Cl.
CPC ......... *H04W 52/0235* (2013.01); *H04L 69/28* (2013.01); *H04W 72/23* (2023.01); *H04W 76/28* (2018.02)

(58) Field of Classification Search
CPC .............. H04L 69/28; H04W 52/0216; H04W 52/0229; H04W 52/0235; H04W 52/0248;
(Continued)

(56) References Cited

U.S. PATENT DOCUMENTS 8,085,694 B2 * 12/2011 Wu ................... H04W 52/0216
370/305
10,299,312 B2 * 5/2019 Siomina ................ H04W 68/02
(Continued)

FOREIGN PATENT DOCUMENTS

CN    101534297 A    9/2009
CN    101651530 A    2/2010
(Continued)

OTHER PUBLICATIONS

RP-181463, Catt et al, "New SID: Study on UE Power Saving in NR", 3GPP TSG RAN Meetings #80, La Jolla, USA, Jun. 11-14, 2018, 5 pages.
(Continued)

*Primary Examiner* — Eric Nowlin

(57) ABSTRACT

A sleep method for a terminal device and an apparatus are provided, to meet a power consumption reduction requirement. In this method, if the terminal device receives no wake-up indication signal within a preset time, and InactivityTimer and/or RetransmissionTimer are/is running, the terminal device stops InactivityTimer and/or RetransmissionTimer.

15 Claims, 9 Drawing Sheets

(51) Int. Cl.
*H04L 69/28* (2022.01)
*H04W 72/23* (2023.01)

(58) Field of Classification Search
CPC ... H04W 52/028; H04W 72/23; H04W 76/28; Y02D 30/70
See application file for complete search history.

(56) References Cited

U.S. PATENT DOCUMENTS

| | | | | |
|---|---|---|---|---|
| 10,341,958 | B2* | 7/2019 | Kusashima | H04W 52/30 |
| 10,492,142 | B2* | 11/2019 | Gupta Hyde | H04B 1/04 |
| 10,588,171 | B2* | 3/2020 | Ang | H04W 52/0216 |
| 10,694,392 | B2* | 6/2020 | Ouchi | H04W 16/14 |
| 10,715,281 | B2* | 7/2020 | Loehr | H04L 1/1851 |
| 10,841,876 | B2* | 11/2020 | Bhattad | H04W 72/21 |
| 10,904,845 | B2* | 1/2021 | Bhattad | H04W 56/001 |
| 11,246,095 | B2* | 2/2022 | Kim | H04W 52/0229 |
| 11,284,469 | B2* | 3/2022 | Bergström | H04W 76/28 |
| 11,310,740 | B2* | 4/2022 | Ang | H04W 76/28 |
| 11,356,951 | B2* | 6/2022 | Kalhan | H04W 52/02 |
| 11,483,810 | B2* | 10/2022 | Zhang | H04L 1/0031 |
| 11,564,282 | B2* | 1/2023 | Jiang | H04W 52/0248 |
| 11,606,751 | B2* | 3/2023 | Lee | H04W 76/28 |
| 2009/0238105 | A1 | 9/2009 | Wu | H04W 52/0216 370/311 |
| 2012/0124196 | A1* | 5/2012 | Brisebois | H04W 24/02 709/224 |
| 2017/0105179 | A1* | 4/2017 | Kusashima | H04W 52/367 |
| 2017/0273136 | A1* | 9/2017 | Siomina | H04W 52/0216 |
| 2017/0347270 | A1* | 11/2017 | Iouchi | H04L 5/0098 |
| 2018/0020404 | A1* | 1/2018 | Huang | H04W 52/0229 |
| 2018/0020405 | A1* | 1/2018 | Huang | H04W 52/0229 |
| 2018/0049126 | A1* | 2/2018 | Cheng | H04W 76/28 |
| 2018/0098287 | A1* | 4/2018 | Ang | H04W 52/0229 |
| 2018/0234921 | A1* | 8/2018 | Huang | H04W 52/0235 |
| 2018/0255515 | A1* | 9/2018 | Gupta Hyde | H04W 52/0235 |
| 2018/0288746 | A1* | 10/2018 | Zhang | H04L 1/0031 |
| 2018/0332533 | A1* | 11/2018 | Bhattad | H04W 52/0235 |
| 2018/0332549 | A1* | 11/2018 | Bhattad | H04W 56/001 |
| 2018/0332655 | A1* | 11/2018 | Ang | H04W 52/0216 |
| 2019/0045445 | A1* | 2/2019 | Huang | H04W 52/0229 |
| 2019/0081743 | A1* | 3/2019 | Loehr | H04W 76/28 |
| 2020/0120607 | A1* | 4/2020 | Kim | H04W 76/28 |
| 2020/0178176 | A1* | 6/2020 | Kim | H04W 52/212 |
| 2020/0214078 | A1* | 7/2020 | Jiang | H04W 52/0216 |
| 2020/0229095 | A1* | 7/2020 | Shrestha | H04W 8/08 |
| 2021/0176710 | A1* | 6/2021 | Tooher | H04W 52/0219 |
| 2021/0185613 | A1* | 6/2021 | Kalhan | H04W 76/11 |
| 2021/0227469 | A1* | 7/2021 | Kim | H04W 56/001 |
| 2021/0289582 | A1* | 9/2021 | Bergstrom | H04L 1/1812 |
| 2021/0306952 | A1* | 9/2021 | Kuang | H04W 76/28 |
| 2021/0321437 | A1* | 10/2021 | Liu | H04W 52/0216 |
| 2021/0329560 | A1* | 10/2021 | Gao | H04W 76/28 |
| 2021/0352581 | A1* | 11/2021 | Wong | H04J 13/0062 |
| 2021/0352582 | A1* | 11/2021 | Zeng | H04W 72/0446 |
| 2022/0039013 | A1* | 2/2022 | Shi | H04L 1/1864 |
| 2022/0078879 | A1* | 3/2022 | Nimbalker | H04W 52/0216 |
| 2022/0232477 | A1* | 7/2022 | Kim | H04W 52/0229 |

FOREIGN PATENT DOCUMENTS

| | | | |
|---|---|---|---|
| CN | 102421148 A | 4/2012 | |
| CN | 102625432 A | 8/2012 | |
| CN | 103582166 A | 2/2014 | |
| CN | 105813177 A | 7/2016 | |
| CN | 108370602 A | 8/2018 | |
| CN | 109219116 A | 1/2019 | |
| EP | 3826369 A1 * | 5/2021 | ............. H04L 69/28 |
| EP | 3952473 A1 * | 2/2022 | ............ H04L 1/1819 |
| EP | 4135367 A1 * | 2/2023 | ............. H04W 4/70 |
| KR | 20200119256 A * | 10/2020 | |
| WO | 2018126992 A1 | 7/2018 | |
| WO | WO-2019125748 A1 * | 6/2019 | ......... H04L 27/2607 |
| WO | WO-2019158446 A1 * | 8/2019 | .......... H04J 13/0029 |
| WO | WO-2020215332 A1 * | 10/2020 | ........... H04L 1/1819 |
| WO | WO-2022103147 A1 * | 5/2022 | |
| WO | WO-2022154972 A1 * | 7/2022 | ........ H04W 52/0235 |
| WO | WO-2023022488 A1 * | 2/2023 | |

OTHER PUBLICATIONS

Office Action issued in CN 201811044304.2, dated Jun. 28, 2021, total 5 pages.
International Search Report and Written Opinion issued in PCT/CN2019/075084, dated May 17, 2019, total 11 pages.
Office Action issued in CN201811044304.2, dated Mar. 19, 2020, total 8 pages.
Office Action issued in CN201811044304.2, dated Mar. 17, 2021, total 7 pages.
R2-081879, Sunplus mMobile Inc., DRX related correction and clarification Discussion and Decision, 3GPP TSG-RAN WG2 Meeting #61 bis, Shenzhen, China, Mar. 31-Apr. 4, 2008, total 6 pages.
R2-1708758, LG Electronics Inc., Consideration for wake-up signaling in MTC, 3GPP TSG-RAN2 Meeting #99, Berlin, Germany, Aug. 21-25, 2017, total 3 pages.
R1-1900041, Huawei et al., Power saving signal/channel/procedure for triggering adaptation, 3GPP TSG RAN WG1 Ad-Hoc Meeting 1901 Taipei, Jan. 21-25, 2019, total 7 pages.
Extended European Search Report for European Application No. 19846376.2 dated Dec. 1, 2021 (13 pages).
R1-1714092, Apple Inc., Control Information for UE Power Saving, 3GPP TSG-RAN WG1 90, Prague, Czech, Aug. 21-25, 2017, total 6 pages.
R2-080934, Ericsson, Details of MAC DRX Control, TSG-RAN WG2 Meeting #61, Sorento, Italy, Feb. 11-15, 2008, total 5 pages.
R2-1709115, Qualcomm Incorporated, Wake-Up Signaling for C-DRX, 3GPP TSG RAN WG2 NR #99, Aug. 21-25, 2017, Berlin, Germany, total 5 pages.
Office Action issued in CN201811044304.2, dated Jan. 19, 2022, 9 pages.
Communication pursuant to Article 94(3) EPC dated Jan. 18, 2023 issued for European Application No. 19 846 376.2 (7 pages).

* cited by examiner

SLEEP METHOD FOR TERMINAL DEVICE AND APPARATUS

CROSS-REFERENCE TO RELATED APPLICATIONS

This application is a National Stage of International Application No. PCT/CN2019/075084, filed on Feb. 14, 2019, which claims priority to Chinese Patent Application No. 201811044304.2, filed on Sep. 7, 2018 and Chinese Patent Application No. 201810902746.X, filed on Aug. 9, 2018, all of which are hereby incorporated by reference in their entireties.

TECHNICAL FIELD

This application relates to the field of communications technologies, and in particular, to a sleep method for a terminal device and an apparatus.

BACKGROUND

A discontinuous reception (DRX) mechanism in a long term evolution (LTE) technology is still used in a fifth-generation (5G) new radio (NR) technology. Abase station configures a DRX cycle for a terminal device (which is also referred to as user equipment (UE)) in a radio resource control (RRC) connected mode. The DRX cycle may be a long DRX cycle, or may be a short DRX cycle. The long DRX cycle is mandatory by default, and the short DRX cycle is optional. If a short DRX cycle is configured, the UE starts a short cycle timer (ShortCycleTimer) when using the short DRX cycle. When ShortCycleTimer expires, the UE switches to a long DRX cycle.

The DRX cycle consists of "On Duration" and "Opportunity for DRX". The UE monitors and receives a physical downlink control channel (PDCCH) during "On Duration", and the UE may not monitor or not receive a PDCCH during "Opportunity for DRX" to reduce power consumption. The DRX mechanism includes an on-duration timer (onDurationTimer or drx-onDurationTimer). At the beginning of each DRX cycle (that is, at the beginning of "on Duration" of each DRX cycle), the UE needs to start onDurationTimer. When onDurationTimer expires, it indicates that "on Duration" ends. In this case, the UE enters "Opportunity for DRX".

In addition, the DRX mechanism further includes an activity timer (InactivityTimer or drx-InactivityTimer). Specifically, when the UE receives a PDCCH indicating new transmission during "on Duration", because the UE is very likely to continue to be scheduled by the base station subsequently, the UE needs to start InactivityTimer. During running of InactivityTimer, the UE needs to monitor and receive a PDCCH. In addition, the DRX mechanism further includes a retransmission timer (RetransmissionTimer or drx-RetransmissionTimer). Because the base station may schedule retransmission of the UE during running of RetransmissionTimer, the UE needs to monitor and receive a PDCCH during running of RetransmissionTimer. RetransmissionTimer specifically includes uplink RetransmissionTimer (RetransmissionTimerUL or drx-RetransmissionTimerUL) and downlink RetransmissionTimer (RetransmissionTimerDL or drx-RetransmissionTimerDL).

In conclusion, the UE needs to monitor and receive a PDCCH during running of onDurationTimer, InactivityTimer, and RetransmissionTimer (RetransmissionTimerUL and RetransmissionTimerDL). The foregoing time may be referred to as an "active time (Active Time)" of DRX. The UE needs to wake up (or awake) to prepare to receive signaling, data, and the like. However, the UE may not need to monitor and receive a PDCCH during running of the foregoing timers or in another special case in which the UE needs to be in an "active time". In this case, the foregoing time is referred to as a "sleep time" of DRX, and the UE may sleep. The another special case in which the UE needs to be in an "active time" is, for example, a process in which a random access contention resolution timer ra-ContentionResolutionTimer runs, or a case in which a scheduling request SR is sent and the SR is still in a pending state, or a case in which a PDCCH that is scrambled by a cell radio network temporary identifier (C-RNTI) and that indicates new transmission is not received after a random access response message is successfully received and the random access response message does not include a corresponding random access preamble.

However, actually, in the foregoing active time, the UE may not need to receive a PDCCH, and may sleep. In other words, the UE may wake up within the foregoing time. Consequently, power consumption for PDCCH monitoring is wasted. Therefore, how to reduce power consumption is an urgent problem to be resolved.

Currently, to reduce power consumption, an indication signal is introduced, and the UE may go to sleep by using the indication signal. However, in a current method, UE may be indicated to sleep only based on "onDuration" or a time of a DRX cycle specified in an existing DRX mechanism. However, when InactivityTimer or RetransmissionTimer is already started, the UE still keeps active for a period of time. Consequently, power consumption of the UE is still increased. Therefore, the existing method cannot reduce power consumption well.

SUMMARY

This application provides a sleep method for a terminal device and an apparatus, to meet a power consumption reduction requirement.

According to a first aspect, this application provides a sleep method for a terminal device.

The method includes in a case in which the terminal device receives no wake-up indication signal within a preset time, if an activity timer InactivityTimer is running, the terminal device stops InactivityTimer; or if a retransmission timer RetransmissionTimer is running, the terminal device stops RetransmissionTimer; or if InactivityTimer and RetransmissionTimer are running, the terminal device stops InactivityTimer and RetransmissionTimer, where discontinuous reception DRX is configured for the terminal device.

The foregoing method can avoid the following case in the prior art: If InactivityTimer is running, even if the terminal device is indicated to go to sleep, the terminal device still needs to remain active for a period of time until the end of the timer. In other words, according to the foregoing method, the terminal device may actually sleep, so that power consumption can be better reduced, thereby meeting a power consumption reduction requirement.

With reference to the first aspect, in a first possible implementation of the first aspect, that the terminal device receives no wake-up indication signal within a preset time may specifically include: The terminal device receives a go-to-sleep signal within the preset time; or the terminal device does not receive a wake-up signal within the preset time; or the terminal device receives an indication signal within the preset time, where the indication signal includes go-to-sleep indication information.

According to the foregoing method, the terminal device may accurately determine that the terminal device receives no wake-up indication signal.

With reference to the first aspect or the first possible implementation of the first aspect, in a second possible implementation of the first aspect, that the terminal device stops InactivityTimer may be specifically: The terminal device stops InactivityTimer when receiving no wake-up indication signal within the preset time; or the terminal device stops InactivityTimer after receiving no wake-up indication signal within the preset time; or the terminal device stops InactivityTimer when a next DRX cycle of a (current) DRX cycle starts.

With reference to any one of the first aspect and the first and the second possible implementations of the first aspect, in a third possible implementation of the first aspect, that the terminal device stops RetransmissionTimer may be specifically: The terminal device stops RetransmissionTimer when a next DRX cycle of a (current) DRX cycle starts.

With reference to any one of the first aspect and the first to the third possible implementations of the first aspect, in a fourth possible implementation of the first aspect, the terminal device may further perform the following operation: If InactivityTimer is running, the terminal device resets InactivityTimer; or if RetransmissionTimer is running, the terminal device resets RetransmissionTimer; or if InactivityTimer and RetransmissionTimer are running, the terminal device resets InactivityTimer and RetransmissionTimer.

According to the foregoing method, when InactivityTimer and/or RetransmissionTimer need/needs to be started next time, InactivityTimer and/or RetransmissionTimer may be enabled to start timing from an initial value, to avoid affecting a normal procedure.

With reference to any one of the first aspect and the first to the fourth possible implementations of the first aspect, in a fifth possible implementation of the first aspect, RetransmissionTimer is an uplink retransmission timer RetransmissionTimerUL and/or a downlink retransmission timer RetransmissionTimerDL.

With reference to any one of the first aspect and the first to the fifth possible implementations of the first aspect, in a sixth possible implementation of the first aspect, the terminal device stops InactivityTimer, and the terminal device starts or restarts a short cycle timer ShortCycleTimer. In this way, when the terminal device stops InactivityTimer in time, an original DRX mechanism remains unchanged, so that the terminal device can continue to use the short DRX cycle.

With reference to any one of the first aspect and the first to the fifth possible implementations of the first aspect, in a seventh possible implementation of the first aspect, the terminal device stops InactivityTimer, and the terminal device uses a long DRX cycle. In this way, the terminal device can be more power-saving.

With reference to the seventh possible implementation of the first aspect, in an eighth possible implementation of the first aspect, if a short cycle timer ShortCycleTimer is running, the terminal device stops ShortCycleTimer, or the terminal device stops and resets ShortCycleTimer. In this way, the terminal device can successfully switch from a short DRX cycle to a long DRX cycle.

With reference to any one of the first aspect and the first to the eighth possible implementations of the first aspect, in a ninth possible implementation of the first aspect, the signal may be in a form of a physical layer sequence, downlink control information (DCI), a medium access control (MAC) control element (control elements, CE) (MAC CE), or a medium access control (MAC) protocol data unit (PDU) (MAC PDU).

With reference to the ninth possible implementation of the first aspect, in a tenth possible implementation of the first aspect, if the signal is downlink control information DCI, the terminal device does not start or restart InactivityTimer.

With reference to any one of the first aspect and the first to the tenth possible implementations of the first aspect, in an eleventh possible implementation of the first aspect, if an on-duration timer is running, the terminal device stops the on-duration timer, or the terminal device stops and resets the on-duration timer.

According to a second aspect, this application provides a sleep method for a terminal device.

The method includes after receiving a go-to-sleep indication signal from a communications device, the terminal device starts or restarts a sleep timer, and sleeps during running of the sleep timer. That the terminal device sleeps during running of the sleep timer includes: The terminal device does not monitor a physical downlink control channel PDCCH during running of the sleep timer.

According to the foregoing method, the terminal device may actually sleep, so that power consumption can be better reduced, thereby meeting a power consumption reduction requirement.

With reference to the second aspect, in a first possible implementation of the second aspect, that the terminal device sleeps during running of the sleep timer may further include: The terminal device does not send a type-0-triggered sounding reference signal type-0-triggered SRS during running of the sleep timer; or the terminal device does not report channel state information CSI during running of the sleep timer; or the terminal device does not send the type-0-triggered SRS and does not report the CSI during running of the sleep timer. The type-0-triggered sounding reference signal is a periodic sounding reference signal periodic SRS and a semi-persistent sounding reference signal semi-persistent SRS. That the terminal device does not send a type-0-triggered sounding reference signal type-0-triggered SRS during running of the sleep timer also means that the terminal device does not send a periodic sounding reference signal periodic SRS and/or a semi-persistent sounding reference signal semi-persistent SRS during running of the sleep timer.

According to the foregoing method, the terminal device may sleep more thoroughly, so that more power consumption can be reduced.

With reference to the second aspect or the first possible implementation of the second aspect, in a second possible implementation of the second aspect, that the terminal device receives a go-to-sleep indication signal from the communications device may include: The terminal device receives a go-to-sleep signal from the communications device; or the terminal device receives an indication signal from the communications device, where the indication signal includes go-to-sleep indication information.

According to the foregoing method, the terminal device may accurately determine that the go-to-sleep indication signal is received.

With reference to any one of the second aspect and the first and the second possible implementations of the second aspect, in a third possible implementation of the second aspect, before the terminal device receives the go-to-sleep indication signal from the communications device, the terminal device further receives sleep duration configured by the communications device.

According to the foregoing method, the terminal device may learn of the sleep duration, so that timing duration subsequently configured for the sleep timer is the sleep duration.

With reference to any one of the second aspect and the first and the second possible implementations of the second aspect, in a fourth possible implementation of the second aspect, the signal includes indication information, and the indication information indicates sleep duration.

According to the foregoing method, the terminal device may learn of the sleep duration by using the indication information, so that timing duration subsequently configured for the sleep timer is the sleep duration.

With reference to the fourth possible implementation of the second aspect, in a fifth possible implementation of the second aspect, before the terminal device receives the go-to-sleep indication signal from the communications device, the terminal device receives at least one piece of duration configured by the communications device, where the sleep duration is one of the at least one piece of duration.

According to the foregoing method, the terminal device may obtain the sleep duration from the at least one piece of duration by using the indication information.

With reference to any one of the second aspect and the third to the fifth possible implementations of the second aspect, in a sixth possible implementation of the second aspect, before starting or restarting the sleep timer, the terminal device configures timing duration of the sleep timer as the sleep duration. In this way, the terminal device may sleep for the sleep duration.

With reference to any one of the second aspect and the first to the sixth possible implementations of the second aspect, in a seventh possible implementation of the first aspect, the signal may be in a form of a physical layer sequence, DCI, a MAC CE, or a MAC PDU.

With reference to any one of the second aspect and the first to the seventh possible implementations of the second aspect, in an eighth possible implementation of the first aspect, the communications device may be a network device such as a base station, or may be another device such as a terminal device.

With reference to the seventh possible implementation of the second aspect, in a ninth possible implementation of the second aspect, if the signal is downlink control information DCI, the terminal device does not start or restart an activity timer InactivityTimer.

According to a third aspect, this application provides a sleep method for a terminal device.

The method includes in a case in which the terminal device receives a go-to-sleep indication signal, if an activity timer InactivityTimer is running, the terminal device stops InactivityTimer; or if a retransmission timer RetransmissionTimer is running, the terminal device stops RetransmissionTimer; or if InactivityTimer and RetransmissionTimer are running, the terminal device stops InactivityTimer and RetransmissionTimer, where discontinuous reception DRX is configured for the terminal device.

The foregoing method can avoid the following case in the prior art: If InactivityTimer is running, even if the terminal device is indicated to go to sleep, the terminal device still needs to remain active for a period of time until the end of the timer. In other words, according to the foregoing method, the terminal device may actually sleep, so that power consumption can be better reduced, thereby meeting a power consumption reduction requirement.

With reference to the third aspect, in a first possible implementation of the third aspect, that the terminal device receives a go-to-sleep indication signal may specifically include: The terminal device receives a go-to-sleep signal; or the terminal device receives an indication signal, where the indication signal includes go-to-sleep indication information.

According to the foregoing method, the terminal device may accurately determine that the terminal device receives the go-to-sleep indication signal.

With reference to the third aspect or the first possible implementation of the third aspect, in a second possible implementation of the third aspect, that the terminal device stops InactivityTimer may be specifically: The terminal device stops InactivityTimer when receiving the go-to-sleep indication signal; or the terminal device stops InactivityTimer after receiving the go-to-sleep indication signal; or the terminal device stops InactivityTimer when a next DRX cycle of a (current) DRX cycle starts.

With reference to any one of the third aspect and the first and the second possible implementations of the third aspect, in a third possible implementation of the third aspect, that the terminal device stops RetransmissionTimer may be specifically: The terminal device stops RetransmissionTimer when a next DRX cycle of a (current) DRX cycle starts.

With reference to any one of the third aspect and the first to the third possible implementations of the third aspect, in a fourth possible implementation of the third aspect, the terminal device may further perform the following operation: If InactivityTimer is running, the terminal device resets InactivityTimer; or if RetransmissionTimer is running, the terminal device resets RetransmissionTimer; or if InactivityTimer and RetransmissionTimer are running, the terminal device resets InactivityTimer and RetransmissionTimer.

According to the foregoing method, when InactivityTimer and/or RetransmissionTimer need/needs to be started next time, InactivityTimer and/or RetransmissionTimer may be enabled to start timing from an initial value, to avoid affecting a normal procedure.

With reference to any one of the third aspect and the first to the fourth possible implementations of the third aspect, in a fifth possible implementation of the third aspect, RetransmissionTimer is an uplink retransmission timer RetransmissionTimerUL and/or a downlink retransmission timer RetransmissionTimerDL.

With reference to any one of the third aspect and the first to the fifth possible implementations of the third aspect, in a sixth possible implementation of the third aspect, the terminal device stops InactivityTimer, and the terminal device starts or restarts a short cycle timer ShortCycleTimer. In this way, when the terminal device stops InactivityTimer in time, an original DRX mechanism remains unchanged, so that the terminal device can continue to use the short DRX cycle.

With reference to any one of the third aspect and the first to the fifth possible implementations of the third aspect, in a seventh possible implementation of the third aspect, the terminal device stops InactivityTimer, and the terminal device uses a long DRX cycle. In this way, the terminal device can be more power-saving.

With reference to the seventh possible implementation of the third aspect, in an eighth possible implementation of the third aspect, if a short cycle timer ShortCycleTimer is running, the terminal device stops ShortCycleTimer, or the terminal device stops and resets ShortCycleTimer. In this way, the terminal device can successfully switch from a short DRX cycle to a long DRX cycle.

With reference to any one of the third aspect and the first to the eighth possible implementations of the third aspect, in a ninth possible implementation of the third aspect, the signal may be in a form of a physical layer sequence, DCI, a MAC CE, or a MAC PDU.

With reference to the ninth possible implementation of the third aspect, in a tenth possible implementation of the third aspect, if the signal is downlink control information DCI, the terminal device does not start or restart InactivityTimer.

With reference to any one of the third aspect and the first to the tenth possible implementations of the third aspect, in an eleventh possible implementation of the third aspect, if an on-duration timer is running, the terminal device stops the on-duration timer, or the terminal device stops and resets the on-duration timer.

According to a fourth aspect, this application provides a sleep method for a terminal device.

The method includes terminal device receiving an indication message, where the indication message is used to indicate the terminal device to stop a specific timer; and if an on-duration timer onDurationTimer is running, the terminal device stops onDurationTimer; or if an activity timer InactivityTimer is running, the terminal device stops InactivityTimer; or if onDurationTimer and InactivityTimer are running, the terminal device stops onDurationTimer and InactivityTimer, where DRX is configured for the terminal device.

According to the foregoing method, the terminal device may go to sleep in time, so that power consumption can be better reduced, thereby meeting a power consumption reduction requirement.

With reference to the fourth aspect, in a first possible implementation of the fourth aspect, if a retransmission timer RetransmissionTimer is running, the terminal device stops RetransmissionTimer. The RetransmissionTimer is an uplink retransmission timer RetransmissionTimerUL and/or a downlink retransmission timer RetransmissionTimerDL.

With reference to the fourth aspect or the first possible implementation of the fourth aspect, in a second possible implementation of the fourth aspect, the indication message is a physical layer sequence, DCI, a MAC CE, or a MAC PDU.

With reference to any one of the fourth aspect and the first and the second possible implementations of the fourth aspect, in a third possible implementation of the fourth aspect, that the terminal device receives an indication message may be specifically: The terminal device receives the indication message when using a long DRX cycle.

With reference to the third possible implementation of the fourth aspect, in a fourth possible implementation of the fourth aspect, the terminal device continues to use the long DRX cycle.

With reference to any one of the fourth aspect and the first and the second possible implementations of the fourth aspect, in a fifth possible implementation of the fourth aspect, that the terminal device receives an indication message may be specifically: The terminal device receives the indication message when using a short DRX cycle.

With reference to the fifth possible implementation of the fourth aspect, in a sixth possible implementation of the fourth aspect, the terminal device continues to use the short DRX cycle.

With reference to the fifth or the sixth possible implementation of the fourth aspect, in a seventh possible implementation of the fourth aspect, the terminal device does not start or restart a short cycle timer ShortCycleTimer.

With reference to any one of the fourth aspect and the first to the seventh possible implementations of the fourth aspect, in an eighth possible implementation of the fourth aspect, if onDurationTimer is running, the terminal device may further reset onDurationTimer; or if InactivityTimer is running, the terminal device may further reset InactivityTimer.

According to the foregoing method, when InactivityTimer and/or onDurationTimer need/needs to be started next time, InactivityTimer and/or onDurationTimer may be enabled to start timing from an initial value, to avoid affecting a normal procedure.

With reference to the first possible implementation of the fourth aspect, in a ninth possible implementation of the fourth aspect, if RetransmissionTimer is running, the terminal device may further reset RetransmissionTimer.

According to the foregoing method, when RetransmissionTimer needs to be started next time, RetransmissionTimer may be enabled to start timing from an initial value, to avoid affecting a normal procedure.

According to a fifth aspect, this application further provides a terminal device. The terminal device includes:

a receiving unit, configured to receive a signal; and a processing unit, configured to: in a case in which the receiving unit receives no wake-up indication signal within a preset time, if an activity timer InactivityTimer is running, stop InactivityTimer; or if a retransmission timer RetransmissionTimer is running, stop RetransmissionTimer; or if InactivityTimer and RetransmissionTimer are running, stop InactivityTimer and RetransmissionTimer, where discontinuous reception DRX is configured for the terminal device.

With reference to the fifth aspect, in a first possible implementation of the fifth aspect, when receiving no wake-up indication signal within the preset time, the receiving unit is specifically configured to: receive a go-to-sleep signal within the preset time; or skip receiving a wake-up signal within the preset time; or receive an indication signal within the preset time, where the indication signal includes go-to-sleep indication information.

With reference to the fifth aspect or the first possible implementation of the fifth aspect, in a second possible implementation of the fifth aspect, when stopping InactivityTimer, the processing unit is specifically configured to: stop InactivityTimer when a next DRX cycle of a (current) DRX cycle starts.

With reference to any one of the fifth aspect and the first and the second possible implementations of the fifth aspect, in a third possible implementation of the fifth aspect, when stopping RetransmissionTimer, the processing unit is specifically configured to stop RetransmissionTimer when a next DRX cycle of a (current) DRX cycle starts.

With reference to any one of the fifth aspect and the first to the third possible implementations of the fifth aspect, in a fourth possible implementation of the fifth aspect, the processing unit is further configured to: if InactivityTimer is running, reset InactivityTimer; or if RetransmissionTimer is running, reset RetransmissionTimer; or if InactivityTimer and RetransmissionTimer are running, reset InactivityTimer and RetransmissionTimer.

With reference to any one of the fifth aspect and the first to the fourth possible implementations of the fifth aspect, in a fifth possible implementation of the fifth aspect, RetransmissionTimer is an uplink retransmission timer RetransmissionTimerUL and/or a downlink retransmission timer RetransmissionTimerDL.

With reference to any one of the fifth aspect and the first to the fifth possible implementations of the fifth aspect, in a sixth possible implementation of the fifth aspect, the processing unit is further configured to stop InactivityTimer, and start or restart a short cycle timer ShortCycleTimer.

With reference to any one of the fifth aspect and the first to the fifth possible implementations of the fifth aspect, in a seventh possible implementation of the fifth aspect, the processing unit is further configured to stop InactivityTimer, and use a long DRX cycle.

With reference to the seventh possible implementation of the fifth aspect, in an eighth possible implementation of the fifth aspect, the processing unit is further configured to: if a short cycle timer ShortCycleTimer is running, stop ShortCycleTimer, or stop and reset ShortCycleTimer.

With reference to any one of the fifth aspect and the first to the eighth possible implementations of the fifth aspect, in a ninth possible implementation of the fifth aspect, the signal may be in a form of a physical layer sequence, DCI, a MAC CE, or a MAC PDU.

With reference to the ninth possible implementation of the fifth aspect, in a tenth possible implementation of the fifth aspect, if the signal is downlink control information DCI, the terminal device does not start or restart InactivityTimer.

With reference to any one of the fifth aspect and the first to the tenth possible implementations of the fifth aspect, in an eleventh possible implementation of the fifth aspect, if an on-duration timer is running, the processing unit is further configured to stop the on-duration timer, or stop and reset the on-duration timer.

According to a sixth aspect, this application further provides a terminal device. The terminal device includes:

a receiving unit, configured to receive a go-to-sleep indication signal from a communications device; and a processing unit, configured to start or restart a sleep timer, and sleep during running of the sleep timer, where that the processing unit sleeps during running of the sleep timer includes: skipping monitoring a physical downlink control channel PDCCH during running of the sleep timer.

With reference to the sixth aspect, in a first possible implementation of the sixth aspect, when sleeping during running of the sleep timer, the processing unit is further configured to:

skip sending a type-0-triggered sounding reference signal type-0-triggered SRS during running of the sleep timer; or skip reporting channel state information CSI during running of the sleep timer; or skip sending the type-0-triggered SRS and skip reporting the CSI during running of the sleep timer.

With reference to the sixth aspect or the first possible implementation of the sixth aspect, in a second possible implementation of the sixth aspect, when receiving the go-to-sleep indication signal from the communications device, the receiving unit is specifically configured to: receive a go-to-sleep signal from the communications device; or receive an indication signal from the communications device, where the indication signal includes go-to-sleep indication information.

With reference to any one of the sixth aspect and the first and the second possible implementations of the sixth aspect, in a third possible implementation of the sixth aspect, before receiving the go-to-sleep indication signal from the communications device, the receiving unit is further configured to receive sleep duration configured by the communications device.

With reference to any one of the sixth aspect and the first and the second possible implementations of the sixth aspect, in a fourth possible implementation of the sixth aspect, the signal includes indication information, and the indication information indicates sleep duration.

With reference to the fourth possible implementation of the sixth aspect, in a fifth possible implementation of the sixth aspect, before receiving the go-to-sleep indication signal from the communications device, the receiving unit is further configured to receive at least one piece of duration configured by the communications device, where the sleep duration is one of the at least one piece of duration.

With reference to any one of the sixth aspect and the third to the fifth possible implementations of the sixth aspect, in a sixth possible implementation of the sixth aspect, before starting or restarting the sleep timer, the processing unit is further configured to configure timing duration of the sleep timer as the sleep duration.

With reference to any one of the sixth aspect and the first to the sixth possible implementations of the sixth aspect, in a seventh possible implementation of the sixth aspect, the signal may be in a form of a physical layer sequence, DCI, a MAC CE, or a MAC PDU.

With reference to the seventh possible implementation of the sixth aspect, in an eighth possible implementation of the sixth aspect, if the signal is downlink control information DCI, the terminal device does not start or restart an activity timer InactivityTimer.

According to a seventh aspect, this application further provides a terminal device. The terminal device includes:

a receiving unit, configured to receive a signal; and a processing unit, configured to: in a case in which the receiving unit receives a go-to-sleep indication signal, if an activity timer InactivityTimer is running, stop InactivityTimer; or if a retransmission timer RetransmissionTimer is running, stop RetransmissionTimer; or if InactivityTimer and RetransmissionTimer are running, stop InactivityTimer and RetransmissionTimer, where discontinuous reception DRX is configured for the terminal device.

With reference to the seventh aspect, in a first possible implementation of the seventh aspect, when receiving the go-to-sleep indication signal, the receiving unit is specifically configured to: receive a go-to-sleep signal; or receive an indication signal, where the indication signal includes go-to-sleep indication information.

With reference to the seventh aspect or the first possible implementation of the seventh aspect, in a second possible implementation of the seventh aspect, when stopping InactivityTimer, the processing unit is specifically configured to stop InactivityTimer when a next DRX cycle of a (current) DRX cycle starts.

With reference to any one of the seventh aspect and the first and the second possible implementations of the seventh aspect, in a third possible implementation of the seventh aspect, when stopping RetransmissionTimer, the processing unit is specifically configured to stop RetransmissionTimer when a next DRX cycle of a (current) DRX cycle starts.

With reference to any one of the seventh aspect and the first to the third possible implementations of the seventh aspect, in a fourth possible implementation of the seventh aspect, the processing unit is further configured to: if InactivityTimer is running, reset InactivityTimer; or if RetransmissionTimer is running, reset RetransmissionTimer; or if InactivityTimer and RetransmissionTimer are running, reset InactivityTimer and RetransmissionTimer.

With reference to any one of the seventh aspect and the first to the fourth possible implementations of the seventh aspect, in a fifth possible implementation of the seventh aspect, RetransmissionTimer is an uplink retransmission timer RetransmissionTimerUL and/or a downlink retransmission timer RetransmissionTimerDL.

With reference to any one of the seventh aspect and the first to the fifth possible implementations of the seventh aspect, in a sixth possible implementation of the seventh aspect, the processing unit is further configured to stop InactivityTimer, and start or restart a short cycle timer ShortCycleTimer.

With reference to any one of the seventh aspect and the first to the fifth possible implementations of the seventh aspect, in a seventh possible implementation of the seventh aspect, the processing unit is further configured to stop InactivityTimer, and use a long DRX cycle.

With reference to the seventh possible implementation of the seventh aspect, in an eighth possible implementation of the seventh aspect, the processing unit is further configured to: if ShortCycleTimer is running, stop ShortCycleTimer, or stop and reset ShortCycleTimer.

With reference to any one of the seventh aspect and the first to the eighth possible implementations of the seventh aspect, in a ninth possible implementation of the seventh aspect, the signal may be in a form of a physical layer sequence, DCI, a MAC CE, or a MAC PDU.

With reference to the ninth possible implementation of the seventh aspect, in a tenth possible implementation of the seventh aspect, if the signal is downlink control information DCI, the terminal device does not start or restart InactivityTimer.

With reference to any one of the seventh aspect and the first to the tenth possible implementations of the seventh aspect, in an eleventh possible implementation of the seventh aspect, if an on-duration timer is running, the processing unit is further configured to stop the on-duration timer, or stop and reset the on-duration timer.

According to an eighth aspect, this application further provides a terminal device. The terminal device includes:

a receiving unit, configured to receive an indication message, where the indication message is used to indicate the terminal device to stop a specific timer, and discontinuous reception DRX is configured for the terminal device; and a processing unit, configured to: if an on-duration timer onDurationTimer is running, stop onDurationTimer; or if an activity timer InactivityTimer is running, stop InactivityTimer; or if onDurationTimer and InactivityTimer are running, stop onDurationTimer and InactivityTimer.

With reference to the eighth aspect, in a first possible implementation of the eighth aspect, the processing unit is further configured to: if a retransmission timer RetransmissionTimer is running, stop RetransmissionTimer. The RetransmissionTimer is an uplink retransmission timer RetransmissionTimerUL and/or a downlink retransmission timer RetransmissionTimerDL.

With reference to the eighth aspect or the first possible implementation of the eighth aspect, in a second possible implementation of the eighth aspect, the indication message is a physical layer sequence, DCI, a MAC CE, or a MAC PDU.

With reference to any one of the eighth aspect and the first and the second possible implementations of the eighth aspect, in a third possible implementation of the eighth aspect, when receiving the indication message, the receiving unit is specifically configured to receive the indication message when the processing unit uses a long DRX cycle.

With reference to the third possible implementation of the eighth aspect, in a fourth possible implementation of the eighth aspect, the processing unit is further configured to continue to use the long DRX cycle.

With reference to any one of the eighth aspect and the first and the second possible implementations of the eighth aspect, in a fifth possible implementation of the eighth aspect, that the terminal device receives an indication message may be specifically: The terminal device receives the indication message when using a short DRX cycle.

With reference to the fifth possible implementation of the eighth aspect, in a sixth possible implementation of the eighth aspect, the terminal device continues to use the short DRX cycle.

With reference to the fifth or the sixth possible implementation of the eighth aspect, in a seventh possible implementation of the eighth aspect, the terminal device does not start or restart a short cycle timer ShortCycleTimer.

According to a ninth aspect, this application further provides a terminal device. The terminal device includes a transceiver, at least one memory, and at least one processor. The transceiver is configured to receive and send a signal when being invoked by the processor. The processor is configured to be coupled to the memory, and invoke a program in the memory, to perform the following steps: in a case in which the transceiver receives no wake-up indication signal within a preset time, if an activity timer InactivityTimer is running, stopping InactivityTimer; or if a retransmission timer RetransmissionTimer is running, stopping RetransmissionTimer; or if InactivityTimer and RetransmissionTimer are running, stopping InactivityTimer and RetransmissionTimer, where discontinuous reception DRX is configured for the terminal device.

With reference to the ninth aspect, in a first possible implementation of the ninth aspect, when receiving no wake-up indication signal within the preset time, the transceiver is specifically configured to: receive a go-to-sleep signal within the preset time; or skip receiving a wake-up signal within the preset time; or receive an indication signal within the preset time, where the indication signal includes go-to-sleep indication information.

With reference to the ninth aspect or the first possible implementation of the ninth aspect, in a second possible implementation of the ninth aspect, when stopping InactivityTimer, the processor is specifically configured to stop InactivityTimer when a next DRX cycle of a (current) DRX cycle starts.

With reference to any one of the ninth aspect and the first and the second possible implementations of the ninth aspect, in a third possible implementation of the ninth aspect, when stopping RetransmissionTimer, the processor is specifically configured to stop RetransmissionTimer when a next DRX cycle of a (current) DRX cycle starts.

With reference to any one of the ninth aspect and the first to the third possible implementations of the ninth aspect, in a fourth possible implementation of the ninth aspect, the processor is further configured to: if InactivityTimer is running, reset InactivityTimer; or if RetransmissionTimer is running, reset RetransmissionTimer; or if InactivityTimer and RetransmissionTimer are running, reset InactivityTimer and RetransmissionTimer.

With reference to any one of the ninth aspect and the first to the fourth possible implementations of the ninth aspect, in a fifth possible implementation of the ninth aspect, RetransmissionTimer is an uplink retransmission timer RetransmissionTimerUL and/or a downlink retransmission timer RetransmissionTimerDL.

With reference to any one of the ninth aspect and the first to the fifth possible implementations of the ninth aspect, in a sixth possible implementation of the ninth aspect, the processor is further configured to stop InactivityTimer, and start or restart a short cycle timer ShortCycleTimer.

With reference to any one of the ninth aspect and the first to the fifth possible implementations of the ninth aspect, in a seventh possible implementation of the ninth aspect, the processor is further configured to stop InactivityTimer, and use a long DRX cycle.

With reference to the seventh possible implementation of the ninth aspect, in an eighth possible implementation of the ninth aspect, the processor is further configured to: if a short cycle timer ShortCycleTimer is running, stop ShortCycleTimer, or stop and reset ShortCycleTimer.

With reference to any one of the ninth aspect and the first to the eighth possible implementations of the ninth aspect, in a ninth possible implementation of the ninth aspect, the signal may be in a form of a physical layer sequence, DCI, a MAC CE, or a MAC PDU.

With reference to any one of the ninth aspect and the first to the ninth possible implementations of the ninth aspect, in a tenth possible implementation of the ninth aspect, if an on-duration timer is running, the processor is further configured to stop the on-duration timer, or stop and reset the on-duration timer.

According to a tenth aspect, this application further provides a terminal device. The terminal device includes a transceiver, at least one memory, and at least one processor.

The transceiver is configured to receive a go-to-sleep indication signal from a communications device when being invoked by the processor. The processor is configured to be coupled to the memory, and invoke a program in the memory, to perform the following steps: starting or restarting a sleep timer, and sleeping during running of the sleep timer, where that the processor sleeps during running of the sleep timer includes: skipping monitoring a PDCCH during running of the sleep timer.

With reference to the tenth aspect, in a first possible implementation of the tenth aspect, that the processor sleeps during running of the sleep timer further includes: skipping sending a type-0-triggered sounding reference signal type-0-triggered SRS during running of the sleep timer; or skipping reporting channel state information CSI during running of the sleep timer; or skipping sending the type-0-triggered SRS and skipping reporting the CSI during running of the sleep timer.

With reference to the tenth aspect or the first possible implementation of the tenth aspect, in a second possible implementation of the tenth aspect, when receiving the go-to-sleep indication signal from the communications device, the transceiver is specifically configured to: receive a go-to-sleep signal from the communications device; or receive an indication signal from the communications device, where the indication signal includes go-to-sleep indication information.

With reference to any one of the tenth aspect and the first and the second possible implementations of the tenth aspect, in a third possible implementation of the tenth aspect, before receiving the go-to-sleep indication signal from the communications device, the transceiver is further configured to receive sleep duration configured by the communications device.

With reference to any one of the tenth aspect and the first and the second possible implementations of the tenth aspect, in a fourth possible implementation of the tenth aspect, the signal includes indication information, and the indication information indicates sleep duration.

With reference to the fourth possible implementation of the tenth aspect, in a fifth possible implementation of the tenth aspect, before receiving the go-to-sleep indication signal from the communications device, the transceiver is further configured to receive at least one piece of duration configured by the communications device, where the sleep duration is one of the at least one piece of duration.

With reference to any one of the tenth aspect and the third to the fifth possible implementations of the tenth aspect, in a sixth possible implementation of the tenth aspect, before starting or restarting the sleep timer, the processor is further configured to configure timing duration of the sleep timer as the sleep duration.

With reference to any one of the tenth aspect and the first to the sixth possible implementations of the tenth aspect, in a seventh possible implementation of the tenth aspect, the signal may be in a form of a physical layer sequence, DCI, a MAC CE, or a MAC PDU.

According to an eleventh aspect, this application further provides a terminal device. The terminal device includes a transceiver, at least one memory, and at least one processor.

The transceiver is configured to receive a signal when being invoked by the processor. The processor is configured to be coupled to the memory, and invoke a program in the memory, to perform the following steps: in a case in which the transceiver receives a go-to-sleep indication signal, if an activity timer InactivityTimer is running, stopping InactivityTimer; or if a retransmission timer RetransmissionTimer is running, stopping RetransmissionTimer; or if InactivityTimer and RetransmissionTimer are running, stopping InactivityTimer and RetransmissionTimer, where discontinuous reception DRX is configured for the terminal device.

With reference to the eleventh aspect, in a first possible implementation of the eleventh aspect, when receiving the go-to-sleep indication signal, the transceiver is specifically configured to: receive a go-to-sleep signal; or receive an indication signal, where the indication signal includes go-to-sleep indication information.

With reference to the eleventh aspect or the first possible implementation of the eleventh aspect, in a second possible implementation of the eleventh aspect, when stopping InactivityTimer, the processor is specifically configured to stop InactivityTimer when a next DRX cycle of a (current) DRX cycle starts.

With reference to any one of the eleventh aspect and the first and the second possible implementations of the eleventh aspect, in a third possible implementation of the eleventh aspect, when stopping RetransmissionTimer, the processor is specifically configured to stop RetransmissionTimer when a next DRX cycle of a (current) DRX cycle starts.

With reference to any one of the eleventh aspect and the first to the third possible implementations of the eleventh aspect, in a fourth possible implementation of the eleventh aspect, the processor is further configured to: if InactivityTimer is running, reset InactivityTimer; or if RetransmissionTimer is running, reset RetransmissionTimer; or if InactivityTimer and RetransmissionTimer are running, reset InactivityTimer and RetransmissionTimer.

With reference to any one of the eleventh aspect and the first to the fourth possible implementations of the eleventh aspect, in a fifth possible implementation of the eleventh aspect, RetransmissionTimer is an uplink retransmission timer RetransmissionTimerUL and/or a downlink retransmission timer RetransmissionTimerDL.

With reference to any one of the eleventh aspect and the first to the fifth possible implementations of the eleventh aspect, in a sixth possible implementation of the eleventh aspect, the processor is further configured to stop InactivityTimer, and start or restart a short cycle timer ShortCycleTimer.

With reference to any one of the eleventh aspect and the first to the fifth possible implementations of the eleventh aspect, in a seventh possible implementation of the eleventh aspect, the processor is further configured to stop InactivityTimer, and use a long DRX cycle.

With reference to the seventh possible implementation of the eleventh aspect, in an eighth possible implementation of the eleventh aspect, the processor is further configured to: if ShortCycleTimer is running, stop ShortCycleTimer, or stop and reset ShortCycleTimer.

With reference to any one of the eleventh aspect and the first to the eighth possible implementations of the eleventh aspect, in a ninth possible implementation of the eleventh aspect, the signal may be in a form of a physical layer sequence, DCI, a MAC CE, or a MAC PDU.

With reference to any one of the eleventh aspect and the first to the ninth possible implementations of the eleventh aspect, in a tenth possible implementation of the eleventh aspect, if an on-duration timer is running, the processor is further configured to stop the on-duration timer, or stop and reset the on-duration timer.

According to a twelfth aspect, this application further provides a terminal device. The terminal device includes a transceiver, at least one memory, and at least one processor.

The transceiver is configured to receive an indication message when being invoked by the processor, where the indication message is used to indicate the terminal device to stop a specific timer, and discontinuous reception DRX is configured for the terminal device.

The processor is configured to be coupled to the memory, and invoke a program in the memory, to perform the following steps: if an on-duration timer onDurationTimer is running, stopping onDurationTimer; or if an activity timer InactivityTimer is running, stopping InactivityTimer; or if onDurationTimer and InactivityTimer are running, stopping onDurationTimer and InactivityTimer.

With reference to the twelfth aspect, in a first possible implementation of the twelfth aspect, the processor is further configured to: if a retransmission timer RetransmissionTimer is running, stop RetransmissionTimer. The RetransmissionTimer is an uplink retransmission timer RetransmissionTimerUL and/or a downlink retransmission timer RetransmissionTimerDL.

With reference to the twelfth aspect or the first possible implementation of the twelfth aspect, in a second possible implementation of the twelfth aspect, the indication message is a physical layer sequence, DCI, a MAC CE, or a MAC PDU.

With reference to any one of the twelfth aspect and the first and the second possible implementations of the twelfth aspect, in a third possible implementation of the twelfth aspect, when receiving the indication message, the transceiver is specifically configured to receive the indication message when the processor uses a long DRX cycle.

With reference to the third possible implementation of the twelfth aspect, in a fourth possible implementation of the twelfth aspect, the processor is further configured to continue to use the long DRX cycle.

With reference to any one of the twelfth aspect and the first and the second possible implementations of the twelfth aspect, in a fifth possible implementation of the twelfth aspect, that the terminal device receives an indication message may be specifically: The terminal device receives the indication message when using a short DRX cycle.

With reference to the fifth possible implementation of the twelfth aspect, in a sixth possible implementation of the twelfth aspect, the terminal device continues to use the short DRX cycle.

With reference to the fifth or the sixth possible implementation of the twelfth aspect, in a seventh possible implementation of the twelfth aspect, the terminal device does not start or restart a short cycle timer ShortCycleTimer.

According to a thirteenth aspect, this application further provides a computer storage medium. The computer storage medium stores a computer-executable instruction, and when the computer-executable instruction is invoked by the computer, the computer is enabled to perform any one of the foregoing methods.

According to a fourteenth aspect, this application further provides a computer program product including an instruction. When the computer program product is run on a computer, the computer is enabled to perform any one of the foregoing methods.

According to a fifteenth aspect, this application further provides a chip. The chip is connected to a memory, and is configured to read and execute a program instruction stored in the memory, to implement any one of the foregoing methods.

According to a sixteenth aspect, this application further provides a state indication method for a terminal device.

The method includes the terminal device receiving a first message from a communications device, where the first message indicates wake-up or sleep time information of the terminal device. If the first message indicates the wake-up time information of the terminal device, the terminal device wakes up based on the time information; or if the first message indicates the sleep time information of the terminal device, the terminal device sleeps based on the time information.

According to the foregoing method, the terminal device may flexibly wake up or sleep based on the first message. In addition, compared with the prior art, because the indication of the sleep time information of the terminal device is introduced, the terminal device can flexibly sleep, so that power consumption can be better reduced, thereby meeting a power consumption reduction requirement.

With reference to the sixteenth aspect, in a first possible implementation of the sixteenth aspect, the first message may include first indication information, and the first indication information indicates the time information. In this way, the first message may indicate the wake-up or sleep time information of the terminal device by using the first indication information.

With reference to the sixteenth aspect or the first possible implementation of the sixteenth aspect, in a second possible implementation of the sixteenth aspect, the first message may include second indication information, and the second indication information indicates the terminal device to wake up or go to sleep.

According to the foregoing method, the first message may indicate the terminal device to wake up or go to sleep by using the second indication information.

With reference to any one of the sixteenth aspect and the first and the second possible implementations of the sixteenth aspect, in a third possible implementation of the sixteenth aspect, the time information may be a time length in which the terminal device keeps awake or sleeping, or the time information may be a time length before the terminal device wakes up or goes to sleep, or the time information may be a time at which wake-up or sleep of the terminal device ends.

According to the foregoing method, a wake-up or go-to-sleep event of the terminal device may be flexibly indicated in a plurality of manners.

With reference to the third possible implementation of the sixteenth aspect, in a fourth possible implementation of the sixteenth aspect, the time length may be one or more milliseconds, one or more subframes, one or more slots, one or more discontinuous reception DRX cycles, one or more pieces of "On Duration", one or more paging occasions (paging occasion, PO), one or more physical downlink control channel PDCCH monitoring occasions, a time length in a unit of a millisecond, a time length in a unit of a subframe, a time length in a unit of a slot, a time length in a unit of a discontinuous reception DRX cycle, a time length in a unit of an amount of "On Duration", a time length in a unit of a paging occasion, or a time length in a unit of a physical downlink control channel PDCCH monitoring occasion.

According to the foregoing method, the time length may be represented in a plurality of manners, and the time length may be relatively flexible.

With reference to the first possible implementation of the sixteenth aspect, in a fifth possible implementation of the sixteenth aspect, the first message may be a MAC PDU or RRC signaling.

With reference to the fifth possible implementation of the sixteenth aspect, in a sixth possible implementation of the sixteenth aspect, the first indication information may be carried in a medium access control subheader of the MAC PDU, or the first indication information may be carried in a MAC CE of the MAC PDU.

According to the foregoing method, the first indication information may be successfully carried in the first message, to indicate the wake-up or sleep time information of the terminal device.

With reference to the second possible implementation of the sixteenth aspect, in a seventh possible implementation of the sixteenth aspect, the first message may be a MAC PDU.

With reference to the seventh possible implementation of the sixteenth aspect, in an eighth possible implementation of the sixteenth aspect, the second indication information may be carried in a medium access control subheader of the MAC PDU, or the second indication information may be carried in a MAC CE of the MAC PDU.

According to the foregoing method, the second indication information may be successfully carried in the first message, to indicate the terminal device to wake up or go to sleep.

With reference to any one of the sixteenth aspect and the first to the fourth possible implementations of the sixteenth aspect, in a ninth possible implementation of the sixteenth aspect, the first message may be a MAC PDU or RRC signaling.

With reference to any one of the sixteenth aspect and the first to the fourth possible implementations of the sixteenth aspect, in a tenth possible implementation of the sixteenth aspect, the first message may be DCI.

With reference to the tenth possible implementation of the sixteenth aspect, in an eleventh possible implementation of the sixteenth aspect, the terminal device does not start or restart an activity timer. In this way, an operation can be saved.

With reference to any one of the sixteenth aspect and the first to the eleventh possible implementations of the sixteenth aspect, in a twelfth possible implementation of the sixteenth aspect, if the first message indicates the sleep time information of the terminal device, and an activity timer is running, the terminal device stops the activity timer, or the terminal device stops and resets the activity timer. In this way, the terminal device can be more power-saving.

With reference to any one of the sixteenth aspect and the first to the eleventh possible implementations of the sixteenth aspect, in a thirteenth possible implementation of the sixteenth aspect, if the first message indicates the sleep time information of the terminal device, and an on-duration timer is running, the terminal device stops the on-duration timer, or the terminal device stops and resets the on-duration timer. In this way, the terminal device can be more power-saving.

With reference to any one of the sixteenth aspect and the first to the eleventh possible implementations of the sixteenth aspect, in a fourteenth possible implementation of the sixteenth aspect, if the first message indicates the sleep time information of the terminal device, and a retransmission timer is running, the terminal device stops the retransmission timer, or the terminal device stops and resets the retransmission timer. In this way, the terminal device can be more power-saving.

According to a seventeenth aspect, this application further provides a terminal device. The terminal device includes:

a receiving unit, configured to receive a first message from a communications device, where the first message indicates wake-up or sleep time information of the terminal device; and a processing unit, configured to: if the first message indicates the wake-up time information of the terminal device, wake up based on the time information; or if the first message indicates the sleep time information of the terminal device, sleep based on the time information.

With reference to the seventeenth aspect, in a first possible implementation of the seventeenth aspect, the first message includes first indication information, and the first indication information indicates the time information.

With reference to the seventeenth aspect or the first possible implementation of the seventeenth aspect, in a second possible implementation of the seventeenth aspect, the first message includes second indication information, and the second indication information indicates the terminal device to wake up or go to sleep.

With reference to any one of the seventeenth aspect and the first and the second possible implementations of the seventeenth aspect, in a third possible implementation of the seventeenth aspect, the time information is a time length in which the terminal device keeps awake or sleeping, or the time information is a time length before the terminal device wakes up or goes to sleep, or the time information is a time at which wake-up or sleep of the terminal device ends.

With reference to the third possible implementation of the seventeenth aspect, in a fourth possible implementation of the seventeenth aspect, the time length is one or more milliseconds, one or more subframes, one or more slots, one or more discontinuous reception DRX cycles, one or more pieces of "On Duration", one or more paging occasions, one or more physical downlink control channel PDCCH monitoring occasions, a time length in a unit of a millisecond, a time length in a unit of a subframe, a time length in a unit of a slot, a time length in a unit of a discontinuous reception DRX cycle, a time length in a unit of an amount of "On Duration", a time length in a unit of a paging occasion, or a time length in a unit of a physical downlink control channel PDCCH monitoring occasion.

With reference to the first possible implementation of the seventeenth aspect, in a fifth possible implementation of the seventeenth aspect, the first message is a MAC PDU or RRC signaling.

With reference to the fifth possible implementation of the seventeenth aspect, in a sixth possible implementation of the seventeenth aspect, the first indication information is carried in a medium access control subheader of the MAC PDU, or the first indication information is carried in a MAC CE of the MAC PDU.

With reference to the second possible implementation of the seventeenth aspect, in a seventh possible implementation of the seventeenth aspect, the first message is a MAC PDU.

With reference to the seventh possible implementation of the seventeenth aspect, in an eighth possible implementation of the seventeenth aspect, the second indication information is carried in a medium access control subheader of the MAC PDU, or the second indication information is carried in a MAC CE of the MAC PDU.

With reference to any one of the seventeenth aspect and the first to the fourth possible implementations of the seventeenth aspect, in a ninth possible implementation of the sixteenth aspect, the first message is a MAC PDU or RRC signaling.

With reference to any one of the seventeenth aspect and the first to the fourth possible implementations of the seventeenth aspect, in a tenth possible implementation of the seventeenth aspect, the first message is DCI.

With reference to the tenth possible implementation of the seventeenth aspect, in an eleventh possible implementation of the seventeenth aspect, the processing unit is further configured to skip starting or restarting an activity timer.

With reference to any one of the seventeenth aspect and the first to the eleventh possible implementations of the seventeenth aspect, in a twelfth possible implementation of the seventeenth aspect, if the first message indicates the sleep time information of the terminal device, and an activity timer is running, the processing unit is further configured to stop the activity timer, or the processing unit is further configured to stop and reset the activity timer.

With reference to any one of the seventeenth aspect and the first to the eleventh possible implementations of the seventeenth aspect, in a thirteenth possible implementation of the seventeenth aspect, if the first message indicates the sleep time information of the terminal device, and an on-duration timer is running, the processing unit is further configured to stop the on-duration timer, or the processing unit is further configured to stop and reset the on-duration timer.

With reference to any one of the seventeenth aspect and the first to the eleventh possible implementations of the seventeenth aspect, in a fourteenth possible implementation of the seventeenth aspect, if the first message indicates the sleep time information of the terminal device, and a retransmission timer is running, the processing unit is further configured to stop the retransmission timer, or the processing unit is further configured to stop and reset the retransmission timer.

According to an eighteenth aspect, this application further provides a terminal device. The terminal device includes a transceiver, at least one memory, and at least one processor. The transceiver is configured to receive and send a signal or a message when being invoked by the processor. The processor is configured to be coupled to the memory, and invoke a program in the memory, to perform the following steps: controlling the transceiver to receive a first message from a communications device, where the first message indicates wake-up or sleep time information of the terminal device; and if the first message indicates the wake-up time information of the terminal device, waking up based on the time information; or if the first message indicates the sleep time information of the terminal device, sleeping based on the time information.

With reference to the eighteenth aspect, in a first possible implementation of the eighteenth aspect, the first message includes first indication information, and the first indication information indicates the time information.

With reference to the eighteenth aspect or the first possible implementation of the eighteenth aspect, in a second possible implementation of the eighteenth aspect, the first message includes second indication information, and the second indication information indicates the terminal device to wake up or go to sleep.

With reference to any one of the eighteenth aspect and the first and the second possible implementations of the eighteenth aspect, in a third possible implementation of the eighteenth aspect, the time information is a time length in which the terminal device keeps awake or sleeping, or the time information is a time length before the terminal device wakes up or goes to sleep, or the time information is a time at which wake-up or sleep of the terminal device ends.

With reference to the third possible implementation of the eighteenth aspect, in a fourth possible implementation of the eighteenth aspect, the time length is one or more milliseconds, one or more subframes, one or more slots, one or more discontinuous reception DRX cycles, one or more pieces of "On Duration", one or more paging occasions (paging occasion, PO), one or more physical downlink control channel PDCCH monitoring occasions, a time length in a unit of a millisecond, a time length in a unit of a subframe, a time length in a unit of a slot, a time length in a unit of a discontinuous reception DRX cycle, a time length in a unit of an amount of "On Duration", a time length in a unit of a paging occasion, or a time length in a unit of a physical downlink control channel PDCCH monitoring occasion.

With reference to the first possible implementation of the eighteenth aspect, in a fifth possible implementation of the eighteenth aspect, the first message is a MAC PDU or RRC signaling.

With reference to the fifth possible implementation of the eighteenth aspect, in a sixth possible implementation of the eighteenth aspect, the first indication information is carried in a medium access control subheader of the MAC PDU, or the first indication information is carried in a MAC CE of the MAC PDU.

With reference to the second possible implementation of the eighteenth aspect, in a seventh possible implementation of the eighteenth aspect, the first message is a MAC PDU.

With reference to the seventh possible implementation of the eighteenth aspect, in an eighth possible implementation of the eighteenth aspect, the second indication information is carried in a medium access control subheader of the MAC PDU, or the second indication information is carried in a MAC CE of the MAC PDU.

With reference to any one of the eighteenth aspect and the first to the fourth possible implementations of the eighteenth aspect, in a ninth possible implementation of the sixteenth aspect, the first message is a MAC PDU or RRC signaling.

With reference to any one of the eighteenth aspect and the first to the fourth possible implementations of the eighteenth aspect, in a tenth possible implementation of the eighteenth aspect, the first message is DCI.

With reference to the tenth possible implementation of the eighteenth aspect, in an eleventh possible implementation of the eighteenth aspect, the processor is further configured to skip starting or restarting an activity timer.

With reference to any one of the eighteenth aspect and the first to the eleventh possible implementations of the eighteenth aspect, in a twelfth possible implementation of the eighteenth aspect, if the first message indicates the sleep time information of the terminal device, and an activity timer is running, the processor is further configured to stop the activity timer, or the processor is further configured to stop and reset the activity timer.

With reference to any one of the eighteenth aspect and the first to the eleventh possible implementations of the eighteenth aspect, in a thirteenth possible implementation of the eighteenth aspect, if the first message indicates the sleep time information of the terminal device, and an on-duration timer is running, the processor is further configured to stop the on-duration timer, or the processor is further configured to stop and reset the on-duration timer.

With reference to any one of the eighteenth aspect and the first to the eleventh possible implementations of the eighteenth aspect, in a fourteenth possible implementation of the eighteenth aspect, if the first message indicates the sleep time information of the terminal device, and a retransmission timer is running, the processor is further configured to stop the retransmission timer, or the processor is further configured to stop and reset the retransmission timer.

According to a nineteenth aspect, this application further provides a computer storage medium. The computer storage medium stores a computer-executable instruction, and when the computer-executable instruction is invoked by the computer, the computer is enabled to perform the method according to the sixteenth aspect.

According to a twentieth aspect, this application further provides a computer program product including an instruction. When the computer program product is run on a computer, the computer is enabled to perform the method according to the sixteenth aspect.

According to a twenty-first aspect, this application further provides a chip. The chip is connected to a memory, and is configured to read and execute a program instruction stored in the memory, to implement the method according to the sixteenth aspect.

DESCRIPTION OF EMBODIMENTS

The following further describes this application in detail with reference to the accompanying drawings.

The embodiments of this application provide a sleep method for a terminal device and an apparatus, to meet a power consumption reduction requirement. The method and the apparatus in this application are based on a same invention concept. The method and the apparatus have similar problem resolving principles. Therefore, for implementation of the apparatus and the method, reference may be made to each other. Details of repeated parts are not described.

The following describes some terms in this application, to facilitate understanding of a person skilled in the art.

Figure 1:
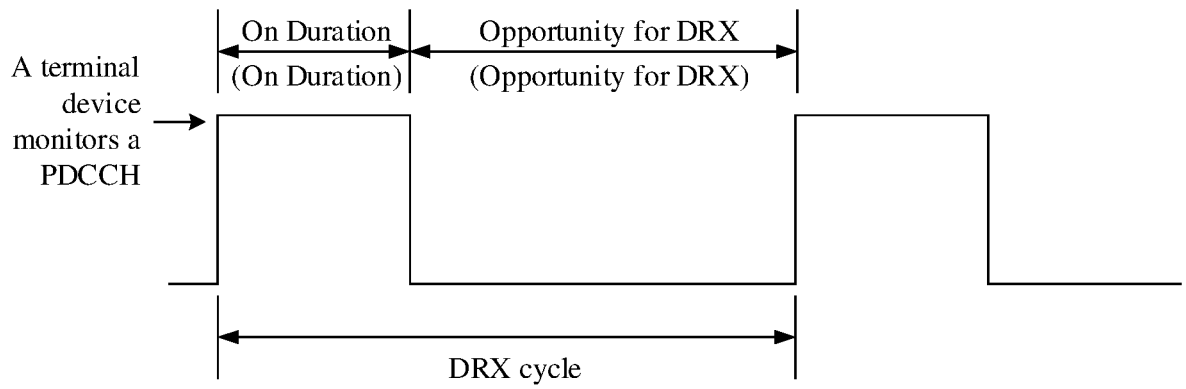
FIG. 1 is a schematic diagram of a DRX cycle according to this application.

(1) DRX cycle: The DRX cycle may include "On Duration" and "Opportunity for DRX" shown in FIG. 1. Within "On Duration", a terminal device monitors and receives a PDCCH. Within an "Opportunity for DRX" time, UE may not monitor or not receive a PDCCH to reduce power consumption. The DRX cycle may be a short DRX cycle or a long DRX cycle. It should be noted that, that the terminal device receives a PDCCH means that the terminal device receives downlink control information (downlink control information, DCI) carried on the PDCCH.

(2) Wake-up signal: The wake-up signal is used to indicate the terminal device to wake up. If no wake-up signal is received within a preset time, the terminal device is indicated to go to sleep by default.

(3) Go-to-sleep signal: The go-to-sleep signal is used to indicate the terminal device to go to sleep. If no go-to-sleep signal is received within a preset time, the terminal device is indicated to wake up by default.

(4) In the embodiments of this application, "a plurality of (pieces)" means two (pieces) or more (pieces).

(5) In the descriptions of this application, words such as "first" and "second" are merely used for differentiation, and shall not be understood as an indication or implication of relative importance or an indication or implication of an order.

For ease of description, in the embodiments of this application, an activity timer is shown as InactivityTimer, a retransmission timer is shown as RetransmissionTimer, and a short cycle timer is shown as ShortCycleTimer.

To describe the technical solutions of the embodiments of this application more clearly, the following describes in detail the sleep method for the terminal device and the apparatus according to the embodiments of this application with reference to the accompanying drawings.

Figure 2:
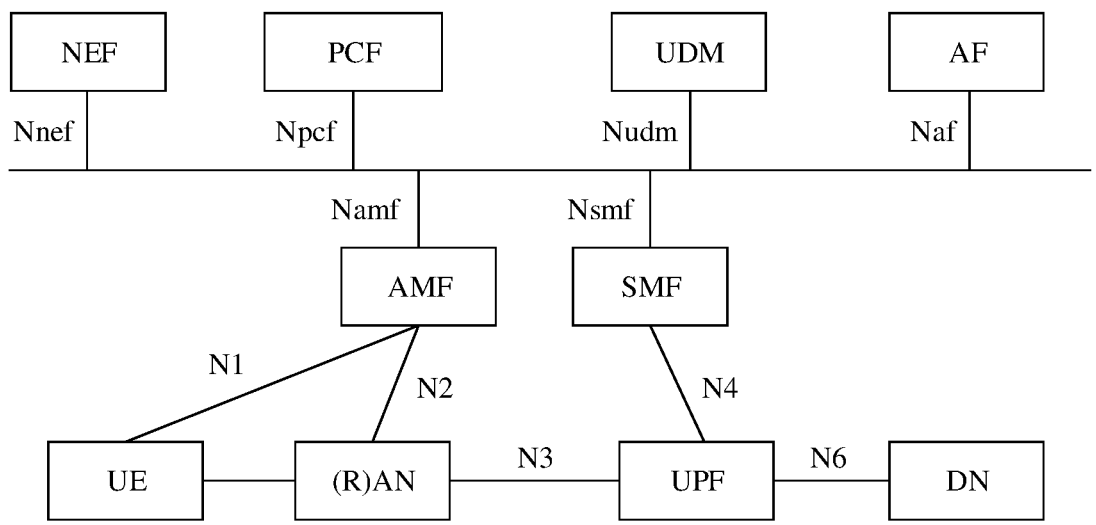
FIG. 2 is an architectural diagram of a communications system according to this application.

A possible architecture of a communications system to which a sleep method for a terminal device provided in an embodiment of this application is applicable may include a network exposure function network element, a policy control function network element, a data management network element, an application function network element, a core network access and mobility management function network element, a session management function network element, a terminal device, an access network device, a user plane function network element, and a data network. FIG. 2 shows a possible example of the architecture of the communications system, which specifically includes an NEF network element, a PCF network element, a UDM network element, an AF network element, an AMF network element, an SMF network element, UE, an access network (AN) device, a UPF network element, and a data network (DN). The AMF network element may be connected to the terminal device through an N1 interface, the AMF may be connected to the AN device through an N2 interface, the AN device may be connected to the UPF through an N3 interface, the SMF may be connected to the UPF through an N4 interface, and the UPF may be connected to the DN through an N6 interface. An interface name is merely an example for description, and is not specifically limited in the embodiments of this application. It should be understood that this embodiment of this application is not limited to the communications system shown in FIG. 2. Names of the network elements shown in FIG. 2 are merely used as examples for description herein, and do not constitute limitations on the network elements included in the architecture of the communications system to which the method in this application is applicable. Functions of the network elements or the devices in the communications system are described in detail below.

The terminal device may also be referred to as user equipment (UE), a mobile station (MS), a mobile terminal (MT), or the like, and is a device that provides voice and/or data connectivity for a user. For example, the terminal device may include a handheld device having a wireless connection function, a vehicle-mounted device, a computing device, a mobile station (MS), or another processing device connected to a wireless modem, or the terminal device may be a mobile terminal that communicates with one or more core networks through an access network. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like. In FIG. 2, the terminal device is shown as UE, which is merely used as an example. No limitation is imposed on the terminal device.

A radio access network may be an access network (AN) shown in FIG. 2 and provides a wireless access service for the terminal device. The access network device is a device, in the communications system, that enables the terminal device to access a wireless network. The access network device is a node in the radio access network, and may also be referred to as a base station or a radio access network (RAN) node (or device). Currently, for example, the access network device is a gNB, a transmission reception point (TRP), an evolved NodeB (evolved Node B, eNB), a radio network controller (RNC), a NodeB (Node B, NB), a base station controller (BSC), a base transceiver station (BTS), a home eNodeB (for example, home evolved NodeB or home Node B, HNB), a baseband unit (BBU), or a wireless fidelity (Wi-Fi) access point (AP).

The data network such as the data network (DN) shown in FIG. 2 may be the Internet, an IP multimedia service (IMS) network, a regional network (that is, a local network, for example, a mobile edge computing (MEC) network), or the like. The data network includes an application server, and the application server provides a service for the terminal device by transmitting data to the terminal device.

A core network is used to enable the terminal device to access a DN that can implement a service of the terminal device. The following describes functions of network elements in the core network.

The core network access and mobility management function network element may be configured to manage access control and mobility of the terminal device. During actual application, the core network access and mobility management function network element includes a mobility management function in a mobility management entity (MME) in a network framework in long term evolution (LTE) and an access management function. Specifically, the core network access and mobility management function network element may be responsible for registration of the terminal device, mobility management, tracking area updating, reachability detection, selection of a session management function network element, mobility status transition management, and the like. For example, in 5G, the core network access and mobility management function network element may be an AMF (access and mobility management function) network element, for example, as shown in FIG. 2. In future communications such as 6G, the core network access and mobility management function network element may still be an AMF network element or have another name. This is not limited in this application. When the core network access and mobility management function network element is an AMF network element, the AMF may provide an Namf service.

The session management function network element may be configured to be responsible for session management (including session establishment, modification, and release) of the terminal device, selection and reselection of the user plane function network element, internet protocol (IP) address allocation of the terminal device, quality of service (QoS) control, and the like. For example, in 5G, the session management function network element may be an SMF (session management function) network element, for example, as shown in FIG. 2. In future communications such as 6G, the session management function network element may still be an SMF network element or have another name. This is not limited in this application. When the session management function network element is an SMF network element, the SMF may provide an Nsmf service.

The policy control function network element may be configured to be responsible for policy control decision-making, and providing functions such as detection that is based on a service data flow and an application, gate control, QoS, and flow-based charging control. For example, in 5G, the policy control function network element may be a PCF (policy control function) network element, for example, as shown in FIG. 2. In future communications such as 6G, the policy control function network element may still be a PCF network element or have another name. This is not limited in this application. When the policy control function network element is a PCF network element, the PCF network element may provide an Npcf service.

The application function network element is mainly configured to interact with a 3rd generation partnership project (3GPP) core network to provide a service, so as to affect service flow routing, access network capability exposure, policy control, and the like. For example, in 5G, the application function network element may be an AF (application function) network element, for example, as shown in FIG. 2. In future communications such as 6G, the application function network element may still be an AF network element or have another name. This is not limited in this application. When the application function network element is an AF network element, the AF network element may provide an Naf service.

The data management network element may be configured to manage subscription data of the terminal device, registration information related to the terminal device, and the like. For example, in 5G, the data management network element may be a unified data management (UDM) network element, for example, as shown in FIG. 2. In future communications such as 6G, the data management network element may still be a UDM network element or have another name. This is not limited in this application. When the data management network element is a UDM network element, the UDM network element may provide an Nudm service.

The network exposure function network element may be configured to enable the 3GPP to securely provide a network service capability for an AF (for example, a service capability server (SCS) or an application server (AS)) of a third party, and the like. For example, in 5G, the network exposure function network element may be an NEF (network exposure function) network element, for example, as shown in FIG. 2. In future communications such as 6G, the network exposure function network element may still be an NEF network element or have another name. This is not limited in this application. When the network exposure function network element is an NEF, the NEF may provide an Nnef service for another network function network element.

The user plane function network element may be configured to forward user plane data of the terminal device, and is mainly configured to: perform data packet routing and forwarding, perform mobility anchoring, support routing of a service flow to the data network by using an uplink classifier, support a multi-homed packet data unit (PDU) session by using a branch point, and the like. For example, in 5G, the user plane function network element may be a UPF (user plane function) network element, for example, as shown in FIG. 2. In future communications such as 6G, the user plane function network element may still be a UPF network element or have another name. This is not limited in this application.

Each network element in the core network may also be referred to as a function entity, and may be a network element implemented on dedicated hardware, or may be a software instance run on dedicated hardware, or an instance of a virtualization function on a proper platform. For example, the virtualization platform may be a cloud platform.

It should be noted that the architecture of the communications system shown in FIG. 2 is not limited to including only the network elements shown in the figure, and may further include other devices not shown in the figure, which are not specifically described herein one by one in this application.

It should be noted that a distribution form of the network elements in the core network is not limited in the embodiments of this application. The distribution form shown in FIG. 2 is merely an example, and is not limited in this application.

For ease of description, the network elements shown in FIG. 2 are used as examples for description subsequently in this application, and an XX network element is directly referred to as XX. It should be understood that a name of each network element in this application is merely used as an example, and the network element may also have another name in future communication, or the network element in this application may be replaced with another entity or device that has a same function in future communications. This is not limited in this application. Unified descriptions are provided herein, and details are not described below.

It should be noted that the communications system shown in FIG. 2 does not constitute a limitation on a communications system to which the embodiments of this application are applicable. The architecture of the communications system shown in FIG. 2 is a 5G system architecture. Optionally, the method in this embodiment of this application is further applicable to various future communications systems, for example, a 6G or another communications network.

Figure 3:
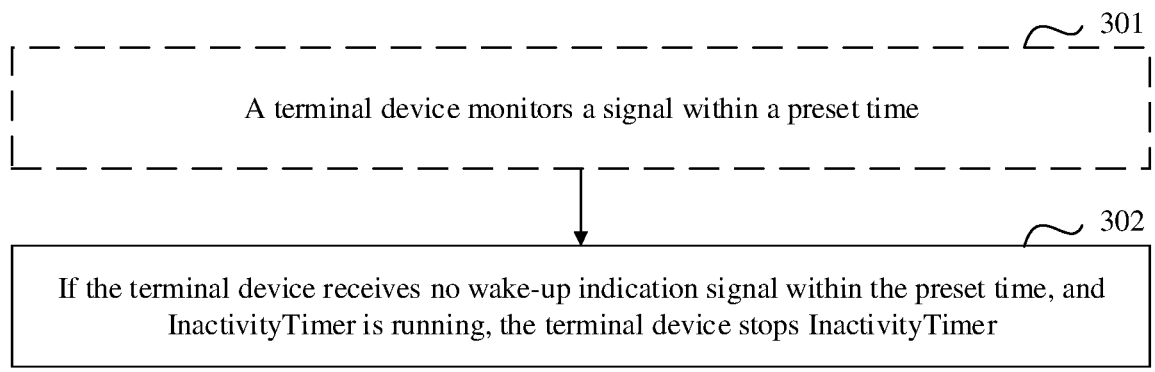
FIG. 3 is a flowchart of a sleep method for a terminal device according to this application.

A sleep method for a terminal device that is provided in an embodiment of this application is applicable to the communications system shown in FIG. 2. Referring to FIG. 3, a specific procedure of the method includes the following steps.

Step 301: The terminal device monitors a signal within a preset time.

DRX is configured for the terminal device. To be specific, the terminal device uses the DRX cycle shown in FIG. 1, the terminal device monitors and receives a PDCCH within the "On Duration" in the DRX cycle, and the terminal device may not monitor or not receive a PDCCH within the "Opportunity for DRX" time to reduce power consumption.

Figure 4:
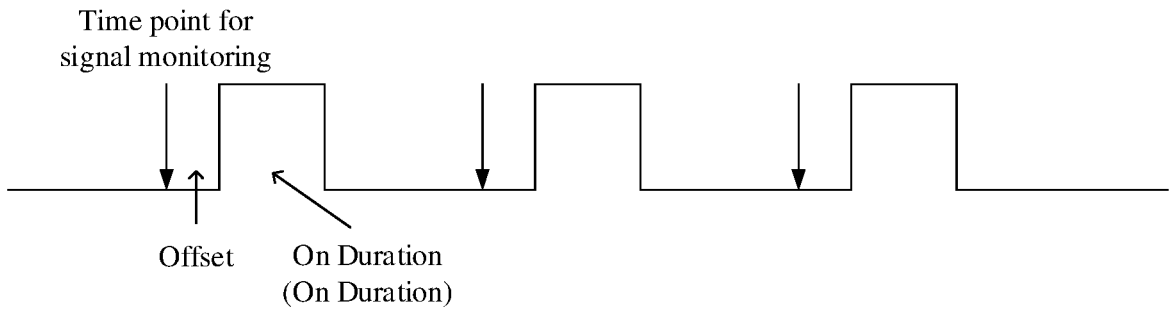
FIG. 4 is a schematic diagram of a preset time for signal monitoring according to this application.
Figure 5:
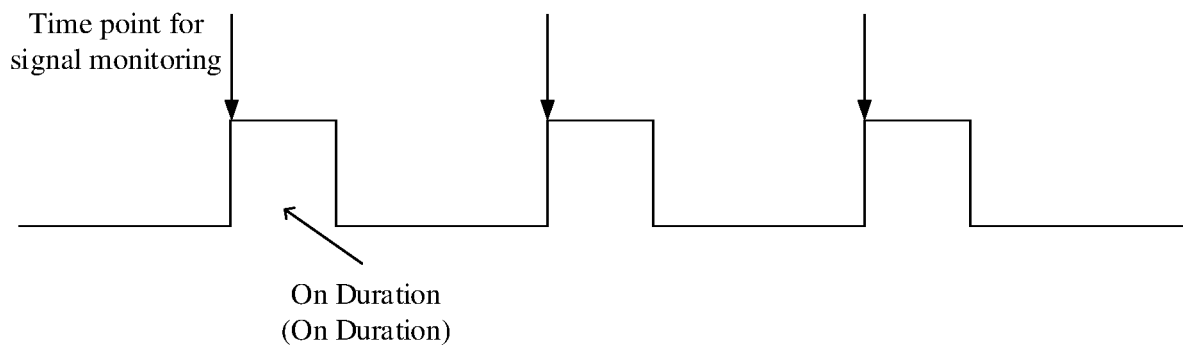
FIG. 5 is a schematic diagram of another preset time for signal monitoring according to this application.
Figure 6:
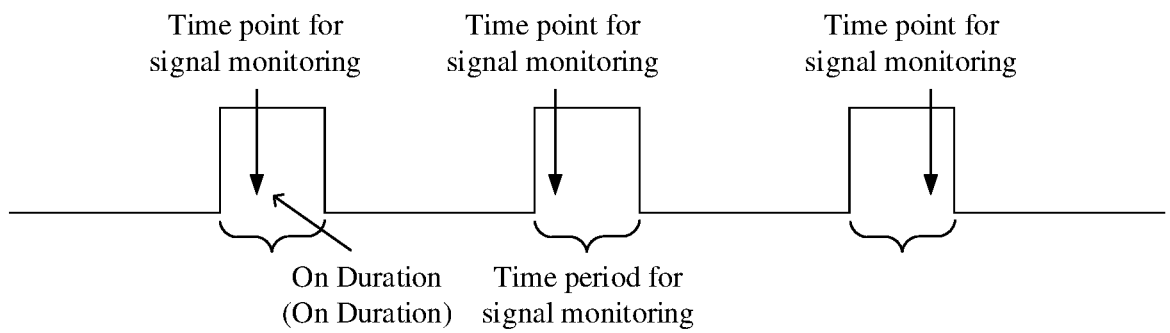
FIG. 6 is a schematic diagram of a preset time for signal monitoring according to this application.

In an optional implementation, the preset time may be a time point, or may be a time period. For example, when the preset time is a time point, the preset time may be a specific time location of an offset before the DRX cycle starts, such as a time point for signal monitoring shown in FIG. 4. For another example, when the preset time is a time point, the preset time may be a time location at which the "On Duration" in the DRX cycle starts (in other words, an offset in the solution shown in FIG. 4 is 0, for example, may be a time point for signal monitoring shown in FIG. 5). For another example, when the preset time is a time point, the preset time may be any moment within the "On Duration" in the DRX cycle, such as a time point for signal monitoring shown in FIG. 6. Alternatively, the preset time may be any moment within an "active time" of DRX. For another example, when the preset time is a time period, the preset time may be a time period starting from a specific time location (which may be a time point described above), and the time period is, for example, one or more symbols (symbol), one or more subframes (subframe), or one or more milliseconds; or the preset time may be a time period before a specific time location (which may be a time point described above) ends, and the time period is, for example, one or more symbols (symbol), one or more subframes (subframe), or one or more milliseconds. For another example, when the preset time is a time period, the preset time may be the "On Duration time" in the DRX cycle, such as a time period for signal monitoring shown in FIG. 6; or the preset time may be an "active time" of DRX. It should be noted that the preset time in the foregoing examples is merely used as an example, and is not intended to limit the preset time in this application. There may be a plurality of other cases of the preset time, which are not enumerated one by one in this application.

In an optional implementation, that the terminal device monitors a signal within a preset time may be specifically: The terminal device monitors a go-to-sleep signal, a wake-up signal, or an indication signal within the preset time. The indication signal may include indication information, and the indication information may indicate go-to-sleep or wake-up, that is, go-to-sleep indication information and wake-up indication information. When the indication signal indicates go-to-sleep, the indication signal includes the go-to-sleep indication information; or when the indication signal indicates wake-up, the indication signal includes the wake-up indication information.

It should be understood that, in a process in which the terminal device monitors a signal within the preset time, the terminal device may receive a signal, or may not receive a signal. In an optional implementation, the signal may be in a form of a physical layer sequence, downlink control information (DCI), a medium access control (MAC) control element (CE) (MAC CE), or a medium access control (MAC) protocol data unit (PDU) (MAC PDU).

In an optional implementation, when the terminal device detects (that is, receives) the go-to-sleep signal within the preset time, or does not detect the wake-up signal within the preset time, or detects an indication signal including the go-to-sleep indication information within the preset time, the terminal device does not need to start onDurationTimer in subsequent n (n is an integer greater than or equal to 1) DRX cycles, or the terminal device does not need to start onDurationTimer within subsequent specified duration, in other words, the terminal device may go to sleep, where onDurationTimer may also be denoted as drx-onDuration-Timer. In this embodiment of this application, only onDurationTimer is used as an example for description. It should be understood that onDurationTimer may be replaced with drx-onDurationTimer.

In an optional implementation, when the terminal device detects (that is, receives) the wake-up signal within the preset time, or does not detect the go-to-sleep signal within the preset time, or detects an indication signal including the wake-up information within the preset time, the terminal device needs to wake up in subsequent n (n is an integer greater than or equal to 1) DRX cycles, or the terminal device needs to be awake within subsequent specified duration, in other words, the terminal device needs to start onDurationTimer.

In an optional implementation, the specified duration may be an absolute time length, for example, N milliseconds (ms), N subframes (subframe), N symbols (symbol), N slots (slot), or N physical downlink control channel monitoring occasions (PDCCH monitoring occasion), where N is a number greater than zero or N is an integer greater than zero. Alternatively, the sleep duration may be in a unit of a DRX cycle or in a unit of "On Duration", for example, N DRX cycles or N pieces of "On Duration", where N is an integer greater than 0. Certainly, the foregoing example is merely an example. The sleep duration may alternatively be other time length information. This is not specifically limited in this application.

It should be noted that step 301 is an optional step. To be specific, the terminal device may not perform this step, but whether the terminal device receives a wake-up indication signal within the preset duration is determined in another manner, and then step 302 is performed. This is not limited in this application.

Step 302: If the terminal device receives no wake-up indication signal within the preset time, and InactivityTimer is running, the terminal device stops InactivityTimer.

InactivityTimer may also be denoted as drx-InactivityTimer. In this embodiment of this application, only InactivityTimer is used as an example for description. It should be understood that InactivityTimer may be replaced with drx-InactivityTimer.

In an optional implementation, the terminal device may receive no wake-up indication signal within the preset time in any one of the following three cases:

Case a1: The terminal device receives a go-to-sleep signal within the preset time.

Case a2: The terminal device does not receive a wake-up signal within the preset time.

Case a3: The terminal device receives an indication signal within the preset time, where the indication signal includes go-to-sleep indication information.

In the foregoing three cases, the terminal device needs to go to sleep. Therefore, when InactivityTimer is running, the terminal device needs to stop InactivityTimer. In this way, the terminal device can actually go to sleep without being affected by InactivityTimer, and does not need to additionally remain active for a period of time, so that power consumption can be better reduced, thereby meeting a power consumption reduction requirement.

In an optional implementation, that the terminal device stops InactivityTimer may be specifically: The terminal device stops InactivityTimer when (or after) receiving no wake-up indication signal within the preset time; or the terminal device stops InactivityTimer when a next DRX cycle of a (current) DRX cycle starts. For example, the (current) DXR cycle is a DRX cycle in which the preset time is located, and the start of the next DRX cycle means a start location of "On Duration" of the next DRX cycle. It should be noted that both a (current) cycle and a next cycle in the following embodiments of this application may be understood as the foregoing descriptions, and repeated parts are not described again below.

In an optional implementation, in Case a1 and Case a3, the terminal device stops InactivityTimer when (or after) receiving no wake-up indication signal within the preset time, which may be specifically that the terminal device stops InactivityTimer when (or after) receiving the go-to-sleep signal or the indication signal.

In an optional implementation, if InactivityTimer is running, the terminal device may further reset InactivityTimer, in other words, set a value of InactivityTimer to an initial value (for example, 0). In this way, when InactivityTimer needs to be started next time, InactivityTimer may be enabled to start timing from 0, to avoid affecting a normal procedure.

In an existing DRX mechanism, if a short DRX cycle is configured for the terminal device, when InactivityTimer expires, the terminal device needs to start or restart a short cycle timer ShortCycleTimer, so that the terminal device uses the short DRX cycle. Therefore, in an optional implementation, the terminal device stops InactivityTimer, and the terminal device starts or restarts ShortCycleTimer. In this way, when the terminal device stops InactivityTimer in time, an original DRX mechanism remains unchanged, so that the terminal device can continue to use the short DRX cycle.

In an optional implementation, that the terminal device starts or restarts ShortCycleTimer may be: The terminal device starts or restarts ShortCycleTimer when (or after) receiving no wake-up indication signal within the preset time, or the terminal device starts or restarts ShortCycleTimer when a next DRX cycle of a (current) DRX cycle starts. In other words, the terminal device starts or restarts ShortCycleTimer while stopping InactivityTimer.

In addition, when the terminal device receives no wake-up indication signal within the preset time, a network device (for example, a base station) does not schedule the terminal device in a subsequent period of time. In this case, the terminal may not use a short DRX cycle subsequently, but use a long DRX cycle, so as to achieve an objective of saving more power. Therefore, in an optional implementation, the terminal device stops InactivityTimer, and the terminal device uses the long DRX cycle.

In an optional implementation, when the terminal device needs to use a long DRX cycle, if ShortCycleTimer is running, the terminal device stops ShortCycleTimer, or the terminal device stops and resets ShortCycleTimer. In this way, the terminal device can successfully switch from a short DRX cycle to a long DRX cycle.

In an optional implementation, that the terminal device stops ShortCycleTimer, or stops and resets ShortCycleTimer may be specifically: The terminal device stops ShortCycleTimer, or stops and resets ShortCycleTimer when (or after) receiving no wake-up indication signal within the preset time; or the terminal device stops ShortCycleTimer, or stops and resets ShortCycleTimer when a next DRX cycle of a (current) DRX cycle starts.

In an optional implementation, if onDurationTimer is running, the terminal device stops onDurationTimer, where onDurationTimer may also be denoted as drx-onDurationTimer. In this embodiment of this application, only onDurationTimer is used as an example for description. It should be understood that onDurationTimer may be replaced with drx-onDurationTimer. For example, that the terminal device receives no wake-up indication signal within "On Duration" in a DRX cycle may also be understood as that the preset time is within the "On Duration" in the DRX cycle. In this case, onDurationTimer may be running, and the terminal device stops onDurationTimer.

In an optional implementation, that the terminal device stops onDurationTimer may be specifically: The terminal device stops onDurationTimer when (or after) receiving no wake-up indication signal within the preset time; or the terminal device stops onDurationTimer when a next DRX cycle of a (current) DRX cycle starts.

In an optional implementation, in Case a1 and Case a3, that the terminal device stops onDurationTimer when (or after) receiving no wake-up indication signal within the preset time may be specifically: The terminal device stops onDurationTimer when (or after) receiving the go-to-sleep signal or the indication signal.

In an optional implementation, if onDurationTimer is running, the terminal device may further reset onDurationTimer, in other words, set a value of onDurationTimer to an initial value (for example, 0). In this way, when onDurationTimer needs to be started next time, onDurationTimer may be enabled to start timing from 0, to avoid affecting a normal procedure.

In an optional implementation, if the signal is DCI, the terminal device does not start or restart the activity timer InactivityTimer. Specifically, in the prior art, when the terminal device receives DCI (a PDCCH) indicating new transmission, the terminal device needs to start or restart InactivityTimer, so as to receive subsequently scheduled data. However, in this implementation, because the first message is not directly related to data scheduling, the terminal device does not need to start or restart InactivityTimer. In a specific implementation, in addition to indicating wake-up or sleep event information of the terminal device, the signal may further have another indication function. For example, the signal may further indicate new transmission. When the signal is DCI indicating new transmission, the terminal device does not start or restart InactivityTimer.

According to the sleep method for the terminal device that is provided in this embodiment of this application, if the terminal device receives no wake-up indication signal within the preset time, and InactivityTimer is running, the terminal device stops InactivityTimer. This can avoid the following case in the prior art: If InactivityTimer is running, even if the terminal device is indicated to go to sleep, the terminal device still needs to remain active for a period of time until the end of the timer. In other words, according to the foregoing method, the terminal device may actually sleep, so that power consumption can be better reduced, thereby meeting a power consumption reduction requirement.

Figure 7:
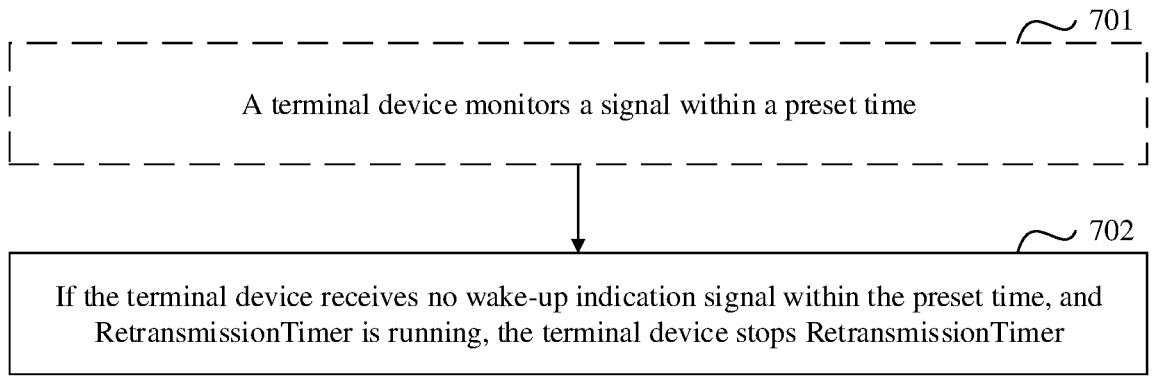
FIG. 7 is a flowchart of another sleep method for a terminal device according to this application.

According to the foregoing embodiments, an embodiment of this application further provides a sleep method for a terminal device, and the method is applicable to the communications system shown in FIG. 2. Referring to FIG. 7, a specific procedure of the method includes the following steps.

Step 701: The terminal device monitors a signal within a preset time.

Specifically, step 701 is similar to step 301 in the embodiment shown in FIG. 3. For details, refer to the descriptions in step 301, and repeated parts are not described herein again.

Step 702: If the terminal device receives no wake-up indication signal within the preset time, and RetransmissionTimer is running, the terminal device stops RetransmissionTimer.

RetransmissionTimer may also be denoted as drx-RetransmissionTimer. In this embodiment of this application, only RetransmissionTimer is used as an example for description. It should be understood that RetransmissionTimer may be replaced with drx-RetransmissionTimer.

In an optional implementation, a case in which the terminal device receives no wake-up indication signal within the preset time is the same as a case in which the terminal device receives no wake-up indication signal within the preset time in step 302 shown in FIG. 3. For details, refer to the related descriptions in step 302, and repeated parts are not described herein again.

In an optional implementation, RetransmissionTimer may be an uplink retransmission timer (RetransmissionTimer (uplink, UL)) and/or a downlink retransmission timer (RetransmissionTimer (downlink, DL)). RetransmissionTimer UL may also be denoted as drx-RetransmissionTimer UL, and RetransmissionTimer DL may also be denoted as drx-RetransmissionTimer DL. In this embodiment of this application, only RetransmissionTimer UL and RetransmissionTimer DL are used as examples for description. It should be understood that RetransmissionTimer UL may be replaced with drx-RetransmissionTimer UL, and RetransmissionTimer DL may be replaced with drx-RetransmissionTimer DL.

In an optional implementation, based on a specific status of RetransmissionTimer, if RetransmissionTimer is running, the terminal device may stop RetransmissionTimer specifically in the following three cases:

Case b1: If RetransmissionTimer UL is running, the terminal device stops RetransmissionTimer UL.

Case b2: If RetransmissionTimer DL is running, the terminal device stops RetransmissionTimer DL.

Case b3: If RetransmissionTimer UL and RetransmissionTimer DL are running, the terminal device stops RetransmissionTimer UL and RetransmissionTimer DL.

In an optional implementation, that the terminal device stops RetransmissionTimer may be specifically: The terminal device stops RetransmissionTimer when (or after) receiving no wake-up indication signal within the preset time; or the terminal device stops RetransmissionTimer when a next DRX cycle of a (current) DRX cycle starts.

In an optional implementation, in Case a1 and Case a3, that the terminal device stops RetransmissionTimer when (or after) receiving no wake-up indication signal within the preset time may be specifically: The terminal device stops RetransmissionTimer when (or after) receiving the go-to-sleep signal or the indication signal.

In an optional implementation, if RetransmissionTimer is running, the terminal device may further reset RetransmissionTimer, in other words, set a value of RetransmissionTimer to an initial value (for example, 0). In this way, when RetransmissionTimer needs to be started next time, RetransmissionTimer may be enabled to start timing from 0, to avoid affecting a normal procedure.

According to the sleep method for the terminal device that is provided in this embodiment of this application, if the terminal device receives no wake-up indication signal within the preset time, and RetransmissionTimer is running, the terminal device stops RetransmissionTimer. This can avoid the following case in the prior art: If RetransmissionTimer is running, even if the terminal device is indicated to go to sleep, the terminal device still needs to remain active for a period of time until the end of the timer. In other words, according to the foregoing method, the terminal device may actually sleep, so that power consumption can be better reduced, thereby meeting a power consumption reduction requirement.

Figure 8:
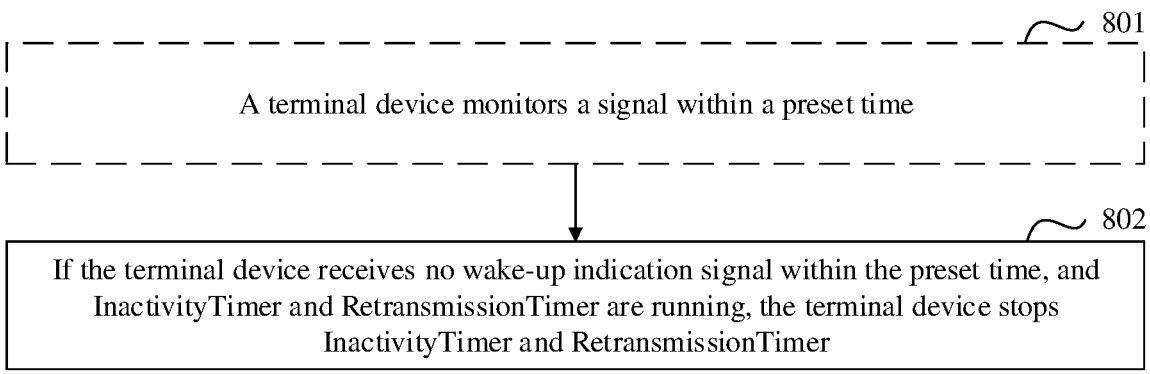
FIG. 8 is a flowchart of another sleep method for a terminal device according to this application.

According to the foregoing embodiments, an embodiment of this application further provides a sleep method for a terminal device, and the method is applicable to the communications system shown in FIG. 2. Referring to FIG. 8, a specific procedure of the method includes the following steps.

Step 801: The terminal device monitors a signal within a preset time.

Specifically, step 801 is similar to step 301 in the embodiment shown in FIG. 3. For details, refer to the descriptions in step 301, and repeated parts are not described herein again.

Step 802: If the terminal device receives no wake-up indication signal within the preset time, and InactivityTimer and RetransmissionTimer are running, the terminal device stops InactivityTimer and RetransmissionTimer.

InactivityTimer is similar to InactivityTimer in the embodiment shown in FIG. 3. For details, refer to the descriptions of InactivityTimer in the embodiment shown in FIG. 3, and repeated parts are not described herein again. Likewise, RetransmissionTimer is similar to RetransmissionTimer in the embodiment shown in FIG. 7. For details, refer to the descriptions of RetransmissionTimer in the embodiment shown in FIG. 3, and repeated parts are not described herein again.

In an optional implementation, RetransmissionTimer may be RetransmissionTimer UL and/or RetransmissionTimer DL. Therefore, if InactivityTimer and RetransmissionTimer are running, the terminal device may stop InactivityTimer and RetransmissionTimer specifically in the following three cases:

Case c1: If InactivityTimer and RetransmissionTimer UL are running, the terminal device stops InactivityTimer and RetransmissionTimer UL.

Case c2: If InactivityTimer and RetransmissionTimer DL are running, the terminal device stops InactivityTimer and RetransmissionTimer DL.

Case c3: If InactivityTimer, RetransmissionTimer UL, and RetransmissionTimer DL are running, the terminal device stops InactivityTimer, RetransmissionTimer UL, and RetransmissionTimer DL.

In an optional implementation, that the terminal device stops InactivityTimer and RetransmissionTimer may be specifically: The terminal device stops InactivityTimer and RetransmissionTimer when (or after) receiving no wake-up indication signal within the preset time; or the terminal device stops InactivityTimer and RetransmissionTimer when a next DRX cycle of a (current) DRX cycle starts.

A related solution in which the terminal device stops InactivityTimer is similar to the related solution in step 302 in the embodiment shown in FIG. 3. For details, reference may be made to each other, and descriptions are not provided herein again. In addition, a related solution in which the terminal device stops RetransmissionTimer is similar to the related solution in step 702 in the embodiment shown in FIG. 7. For details, reference may be made to each other, and descriptions are not provided herein again.

In an optional implementation, if InactivityTimer and RetransmissionTimer are running, the terminal device may further reset InactivityTimer and RetransmissionTimer, in other words, set values of InactivityTimer and RetransmissionTimer to initial values (for example, 0). In this way, when InactivityTimer and RetransmissionTimer need to be started next time, InactivityTimer and RetransmissionTimer may be enabled to start timing from 0, to avoid affecting a normal procedure.

According to the sleep method for the terminal device that is provided in this embodiment of this application, if the terminal device receives no wake-up indication signal within the preset time, and InactivityTimer and RetransmissionTimer are running, the terminal device stops InactivityTimer and RetransmissionTimer. This can avoid the following case in the prior art: If InactivityTimer and RetransmissionTimer are running, even if the terminal device is indicated to go to sleep, the terminal device still needs to remain active for a period of time until the end of the timers. In other words, according to the foregoing method, the terminal device may actually sleep, so that power consumption can be better reduced, thereby meeting a power consumption reduction requirement.

Figure 9:
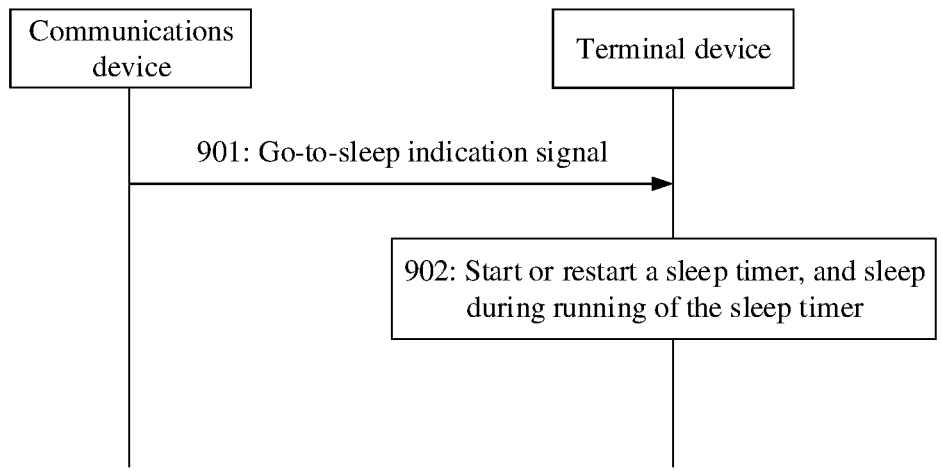
FIG. 9 is a flowchart of another sleep method for a terminal device according to this application.

An embodiment of this application further provides a sleep method for a terminal device, and the method is applicable to the communications system shown in FIG. 2. Referring to FIG. 9, a specific procedure of the method includes the following steps.

Step 901: The terminal device receives a go-to-sleep indication signal from a communications device.

The terminal device may configure DRX, or may not configure DRX. This is not limited in this embodiment.

In an optional implementation, that the terminal device receives a go-to-sleep indication signal from the communications device may be specifically: The terminal device receives a go-to-sleep signal from the communications device; or the terminal device receives an indication signal from the communications device, where the indication signal includes go-to-sleep indication information. A case of the go-to-sleep signal and a case of the indication signal including the go-to-sleep indication information are similar to the case of the go-to-sleep signal and the case of the signal including the go-to-sleep indication information in step 301 in the embodiment shown in FIG. 3, and reference may be made to each other.

In an optional implementation, a form of the go-to-sleep indication signal is similar to a form of the wake-up indication signal in the embodiment shown in FIG. 3. For details, refer to the related descriptions of the signal form in step 301, and descriptions are not provided herein again.

In an optional implementation, the communications device may be a network device such as a base station, or may be another device such as a terminal device. Optionally, in a device-to-device (D2D) scenario, terminal devices may directly communicate with each other without using a network device. In this case, a terminal device may receive a signal sent by another terminal device.

Step 902: The terminal device starts or restarts a sleep timer, and sleeps during running of the sleep timer, where that the terminal device sleeps during running of the sleep timer may include: The terminal device does not monitor a PDCCH during running of the sleep timer.

In an optional implementation, the terminal device may further sleep during running of the sleep timer in the following three manners:

Manner d1: The terminal device does not send a type-0-triggered sounding reference signal (type-0-triggered SRS (sounding reference signal %)) during running of the sleep timer.

Manner d2: Alternatively, the terminal device does not report channel state information (CSI) during running of the sleep timer.

Manner d3: The terminal device does not send the type-0-triggered SRS and does not report the CSI during running of the sleep timer.

In an optional implementation, before the terminal device receives the go-to-sleep indication signal from the communications device (in other words, performs the foregoing step), the terminal device further receives sleep duration configured by the communications device. For example, the terminal device may receive an RRC message, where the RRC message includes the sleep duration configured by the communications device. In this way, the terminal device may subsequently configure required sleep duration for the sleep timer. It should be noted that, when the sleep timer is started or restarted, the sleep timer runs for such a long time as "sleep duration". When the sleep timer runs for such a long time as "sleep duration", it may be considered that the sleep timer expires.

In an optional implementation, the signal includes indication information, and the indication information indicates sleep duration. That the indication information indicates sleep duration may be: The indication information may be directly the sleep duration. In this case, the terminal device may directly learn of the sleep duration. Alternatively, the indication information may indicate one of at least one piece of duration configured by the communications device, and the indicated duration is used as the sleep duration. For example, when the communications device configures 10 pieces of duration, and the indication information is 3, the indication information may indicate that the third duration in the 10 pieces of duration arranged in sequence is the sleep duration. Certainly, the foregoing example is merely an example. The indication information may alternatively indicate the sleep duration in another manner. This is not specifically limited in this application.

In an optional implementation, when the indication information indicates one of at least one piece of duration configured by the communications device, before the terminal device receives the go-to-sleep indication signal from the communications device, the terminal device further receives the at least one piece of duration configured by the communications device. For example, the terminal device may receive an RRC message, where the RRC message includes the at least one piece of duration configured by the communications device, and the sleep duration is one of the at least one piece of duration.

In an optional implementation, after the terminal device learns of the sleep duration in either of the foregoing manners, and before the terminal device starts or restarts the sleep timer, the terminal device further configures timing duration of the sleep timer as the sleep duration. In this way, the terminal device may sleep for the sleep duration as required.

In an optional implementation, the sleep duration may be an absolute time length, for example, N ms, N subframes (subframe), N symbols (symbol), N slots (slot), or N physical downlink control channel monitoring occasions (PDCCH monitoring occasion), where N is a number greater than zero or N is an integer greater than zero. Alternatively, the sleep duration may be in a unit of a DRX cycle or in a unit of "On Duration", for example, N DRX cycles or N pieces of "On Duration", where N is an integer greater than 0. Certainly, the foregoing example is merely an example. The sleep duration may alternatively be other time length information. This is not specifically limited in this application.

In an optional implementation, if the go-to-sleep indication signal is DCI, the terminal device does not start or restart an activity timer InactivityTimer. Specifically, in the prior art, when the terminal device receives DCI (a PDCCH) indicating new transmission, the terminal device needs to start or restart InactivityTimer, so as to receive subsequently scheduled data. However, in this implementation, because the first message is not directly related to data scheduling, the terminal device does not need to start or restart InactivityTimer. In a specific implementation, in addition to indicating wake-up or sleep event information of the terminal device, the go-to-sleep indication signal may further have another indication function. For example, the go-to-sleep indication signal may further indicate new transmission. When the go-to-sleep indication signal is DCI indicating new transmission, the terminal device does not start or restart InactivityTimer.

In an optional implementation, a priority of the sleep timer is higher than that of another "active time" timer. For example, when onDurationTimer and InactivityTimer are running, the terminal device sleeps as long as the sleep timer is running. For another example, when onDurationTimer, InactivityTimer, and RetransmissionTimer are all running, the terminal device sleeps as long as the sleep timer is running.

According to the sleep method for the terminal device that is provided in this embodiment of this application, after receiving the go-to-sleep indication signal from the communications device, the terminal device starts or restarts the sleep timer, and sleeps during running of the sleep timer. That the terminal device sleeps during running of the sleep timer includes: The terminal device does not monitor a PDCCH during running of the sleep timer. According to the foregoing method, the terminal device may actually sleep, so that power consumption can be better reduced, thereby meeting a power consumption reduction requirement.

Figure 10:
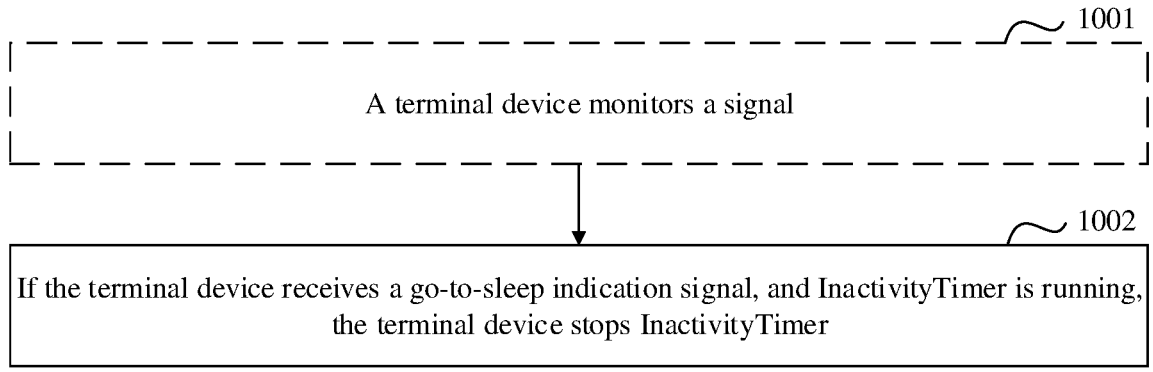
FIG. 10 is a flowchart of another sleep method for a terminal device according to this application.

According to the foregoing embodiments, an embodiment of this application further provides a sleep method for a terminal device, and the method is applicable to the communications system shown in FIG. 2. Referring to FIG. 10, a specific procedure of the method includes the following steps.

Step 1001: The terminal device monitors a signal.

In an optional implementation, the terminal device may monitor a signal within preset duration. Specifically, when the terminal device monitors a signal within the preset duration, step 1001 is similar to step 301 in the embodiment shown in FIG. 3. For details, refer to the descriptions in step 301, and repeated parts are not described herein again.

Step 1002: If the terminal device receives a go-to-sleep indication signal, and InactivityTimer is running, the terminal device stops InactivityTimer.

In an optional implementation, that the terminal device receives a go-to-sleep indication signal may specifically include: The terminal device receives a go-to-sleep signal; or the terminal device receives an indication signal, where the indication signal includes go-to-sleep indication information.

In an optional implementation, if InactivityTimer is running, the terminal device stops InactivityTimer. This is similar to the method in which the terminal device stops InactivityTimer if InactivityTimer is running in step 302 in the embodiment shown in FIG. 3. For details, refer to the related descriptions in step 302, and repeated parts are not described herein again.

According to the sleep method for the terminal device that is provided in this embodiment of this application, if the terminal device receives the go-to-sleep indication signal, and InactivityTimer is running, the terminal device stops InactivityTimer. This can avoid the following case in the prior art: If InactivityTimer is running, even if the terminal device is indicated to go to sleep, the terminal device still needs to remain active for a period of time until the end of the timer. In other words, according to the foregoing method, the terminal device may actually sleep, so that power consumption can be better reduced, thereby meeting a power consumption reduction requirement.

Figure 11:
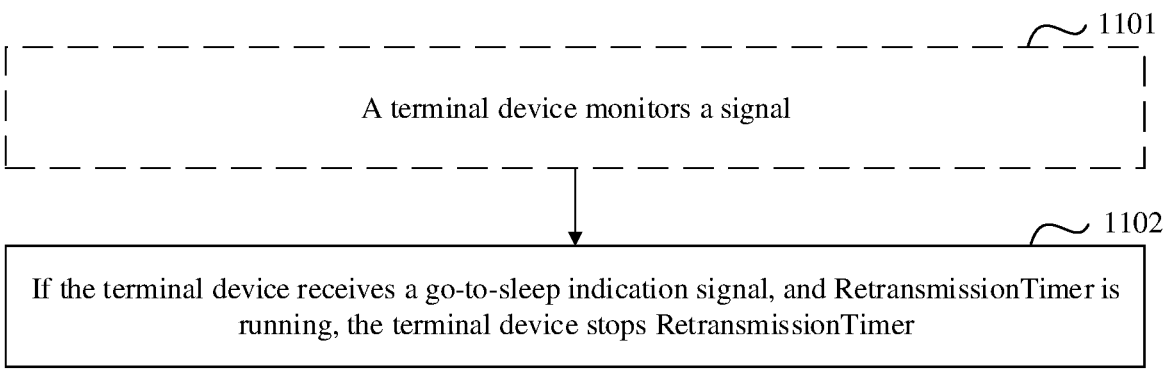
FIG. 11 is a flowchart of another sleep method for a terminal device according to this application.

According to the foregoing embodiments, an embodiment of this application further provides a sleep method for a terminal device, and the method is applicable to the communications system shown in FIG. 2. Referring to FIG. 11, a specific procedure of the method includes the following steps.

Step 1101: The terminal device monitors a signal.

In an optional implementation, the terminal device may monitor a signal within preset duration. Specifically, when the terminal device monitors a signal within the preset duration, step 1101 is similar to step 301 in the embodiment shown in FIG. 3. For details, refer to the descriptions in step 301, and repeated parts are not described herein again.

Step 1102: If the terminal device receives a go-to-sleep indication signal, and RetransmissionTimer is running, the terminal device stops RetransmissionTimer.

In an optional implementation, a case in which the terminal device receives the go-to-sleep indication signal is the same as the case in which the terminal device receives the go-to-sleep indication signal in step 1001. For details, reference may be made to each other, and repeated parts are not described herein again.

In an optional implementation, if RetransmissionTimer is running, the terminal device stops RetransmissionTimer. This is similar to the related method in step 702 in the embodiment shown in FIG. 7. For details, refer to the related descriptions in step 702, and repeated parts are not described herein again.

According to the sleep method for the terminal device that is provided in this embodiment of this application, if the terminal device receives a wake-up indication signal, and RetransmissionTimer is running, the terminal device stops RetransmissionTimer. This can avoid the following case in the prior art: If RetransmissionTimer is running, even if the terminal device is indicated to go to sleep, the terminal device still needs to remain active for a period of time until the end of the timer. In other words, according to the foregoing method, the terminal device may actually sleep, so that power consumption can be better reduced, thereby meeting a power consumption reduction requirement.

Figure 12:
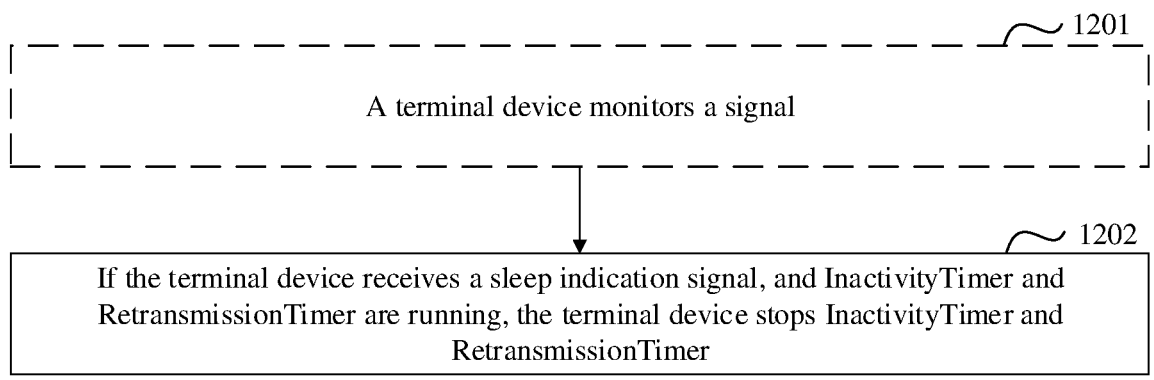
FIG. 12 is a flowchart of another sleep method for a terminal device according to this application.

According to the foregoing embodiments, an embodiment of this application further provides a sleep method for a terminal device, and the method is applicable to the communications system shown in FIG. 2. Referring to FIG. 12, a specific procedure of the method includes the following steps.

Step 1201: The terminal device monitors a signal.

In an optional implementation, the terminal device may monitor a signal within preset duration. Specifically, when the terminal device monitors a signal within the preset duration, step 1101 is similar to step 301 in the embodiment shown in FIG. 3. For details, refer to the descriptions in step 301, and repeated parts are not described herein again.

Step 1202: If the terminal device receives a go-to-sleep indication signal, and InactivityTimer and RetransmissionTimer are running, the terminal device stops InactivityTimer and RetransmissionTimer.

In an optional implementation, a case in which the terminal device receives the go-to-sleep indication signal is the same as the case in which the terminal device receives the go-to-sleep indication signal in step 1001. For details, reference may be made to each other, and repeated parts are not described herein again.

In an optional implementation, that the terminal device stops InactivityTimer and RetransmissionTimer is similar to the related method in step 802 in the embodiment shown in FIG. 8. For details, refer to the related descriptions in step 802, and repeated parts are not described herein again.

According to the sleep method for the terminal device that is provided in this embodiment of this application, if the terminal device receives the go-to-sleep indication signal, and InactivityTimer and RetransmissionTimer are running, the terminal device stops InactivityTimer and RetransmissionTimer. This can avoid the following case in the prior art: If InactivityTimer and RetransmissionTimer are running, even if the terminal device is indicated to go to sleep, the terminal device still needs to remain active for a period of time until the end of the timers. In other words, according to the foregoing method, the terminal device may actually sleep, so that power consumption can be better reduced, thereby meeting a power consumption reduction requirement.

Figure 13:
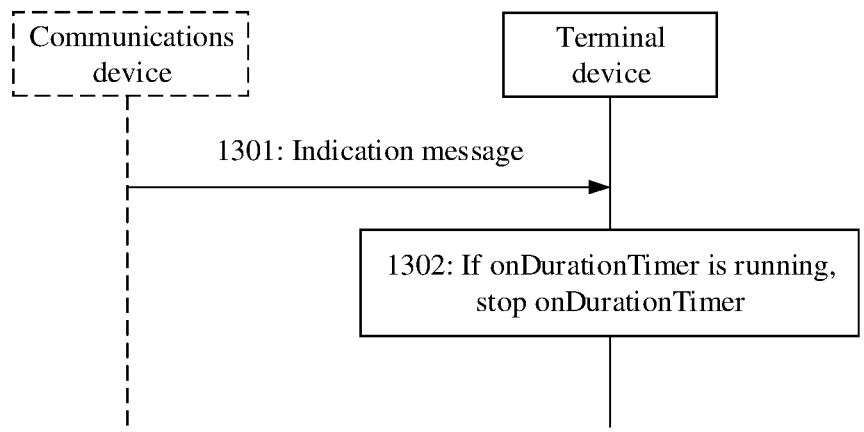
FIG. 13 is a flowchart of another sleep method for a terminal device according to this application.

According to the foregoing embodiments, an embodiment of this application further provides a sleep method for a terminal device, and the method is applicable to the communications system shown in FIG. 2. Referring to FIG. 13, a specific procedure of the method includes the following steps.

Step 1301: The terminal device receives an indication message, where the indication message is used to indicate the terminal device to stop a specific timer.

DRX is configured for the terminal device. To be specific, the terminal device uses the DRX cycle shown in FIG. 1, the terminal device monitors and receives a PDCCH within the "On Duration" in the DRX cycle, and the terminal device may not monitor or not receive a PDCCH within the "Opportunity for DRX" time to reduce power consumption. The specific timer may be one or more of onDurationTimer, InactivityTimer, and RetransmissionTimer (RetransmissionTimerUL and/or RetransmissionTimerDL). It should be noted that the indication message may be a new message, or may be a message obtained by reusing an existing message (or signaling) or by adding a function of "indicating the terminal device to stop a specific timer" to an existing function of the existing message (or signaling). In other words, in addition to a capability of "indicating the terminal device to stop a specific timer", the indication message may further have another function. This is not limited in this application. For example, the indication message may be obtained by reusing an existing long DRX control MAC CE (Long DRX Command MAC CE), or the indication message may be obtained by reusing an existing DRX control MAC CE (DRX Command MAC CE).

In an optional implementation, the terminal device may receive an indication message from a communications device, for example, as shown in the figure. Optionally, the communications device may be a network device such as a base station, or may be another device such as a terminal device.

In an optional implementation, the indication message may be in a form of a physical layer sequence, DCI, a MAC CE, or a MAC PDU.

In an optional implementation, the terminal device may receive the indication message when using a long DRX cycle. In an optional implementation, in a subsequent procedure, the terminal device continues to use the long DRX cycle. In this case, the terminal device receives the indication message not to change a DRX cycle, but mainly to stop one or more of onDurationTimer, InactivityTimer, and RetransmissionTimer, in other words, the terminal device may immediately go to sleep, so as to achieve an objective of saving more power. For example, when the network device finds that there is no data to be sent to the terminal device subsequently, the network device may send the indication message to the terminal device, to indicate that the terminal device may immediately go to sleep. It should be noted that, in another optional implementation, the terminal device receives the indication message when using a long DRX cycle, and uses a short DRX cycle after receiving the indication message; or the terminal device receives the indication message when using a short DRX cycle, and continues to use the short DRX cycle after receiving the indication message; or the terminal device receives the indication message when using a short DRX cycle, and uses a long DRX cycle after receiving the indication message.

In an optional implementation, that the terminal device receives the indication message when using a short DRX cycle, and continues to use the short DRX cycle after receiving the indication message further includes: The terminal device does not start or restart a short cycle timer ShortCycleTimer. In this case, the terminal device receives the indication message not to change a DRX cycle and not to prolong a use time of a short DRX cycle, but mainly to stop one or more of onDurationTimer, InactivityTimer, and RetransmissionTimer, in other words, the terminal device may immediately go to sleep, so as to achieve an objective of saving more power. In this case, if the terminal device starts or restarts the short cycle timer ShortCycleTimer, a time period in which the terminal device is in a short DRX cycle is prolonged, and a longer time is required to enter a long DRX cycle. This is not conducive to power saving. Therefore, the terminal device does not start or restart the short cycle timer ShortCycleTimer, so that the cycle timer ShortCycleTimer continues to perform timing, to enter a long DRX cycle as soon as possible, thereby achieving an objective of saving more power.

It should be noted that, if an existing message (or signaling) such as a DRX control MAC CE (DRX Command MAC CE) is reused, and a function of "skipping starting or restarting a short cycle timer ShortCycleTimer" is added to an existing function of the existing message (or signaling), in a possible manner, an indicator field may be added to the existing message (or signaling), where the indicator field indicates whether the short cycle timer ShortCycleTimer needs to be started or restarted. For example, when the indicator field is a first value, it indicates that the short cycle timer ShortCycleTimer needs to be started or restarted; or when the indicator field is a second value, it indicates that the short cycle timer ShortCycleTimer is not started or restarted.

Step 1302: If onDurationTimer is running, the terminal device stops onDurationTimer.

In an optional implementation, that the terminal device stops onDurationTimer may be specifically: The terminal device stops onDurationTimer when receiving the indication message; or the terminal device stops onDurationTimer after receiving the indication message.

In an optional implementation, if onDurationTimer is running, the terminal device may further reset onDurationTimer (the terminal device stops and resets onDurationTimer), in other words, set a value of onDurationTimer to an initial value (for example, 0). In this way, when onDurationTimer needs to be started next time, onDurationTimer may be enabled to start timing from 0, to avoid affecting a normal procedure.

In an optional implementation, if RetransmissionTimer is running, the terminal device stops RetransmissionTimer. RetransmissionTimer may be RetransmissionTimerUL and/or RetransmissionTimerDL. RetransmissionTimer UL may also be denoted as drx-RetransmissionTimer UL, and RetransmissionTimer DL may also be denoted as drx-RetransmissionTimer DL. In this embodiment of this application, only RetransmissionTimer UL and RetransmissionTimer DL are used as examples for description. It should be understood that RetransmissionTimer UL may be replaced with drx-RetransmissionTimer UL, and RetransmissionTimer DL may be replaced with drx-RetransmissionTimer DL.

In an optional implementation, based on a specific status of RetransmissionTimer, if RetransmissionTimer is running, the terminal device may stop RetransmissionTimer specifically in the following three cases:

Case d1: If RetransmissionTimer UL is running, the terminal device stops RetransmissionTimer UL.

Case d2: If RetransmissionTimer DL is running, the terminal device stops RetransmissionTimer DL.

Case d3: If RetransmissionTimer UL and RetransmissionTimer DL are running, the terminal device stops RetransmissionTimer UL and RetransmissionTimer DL.

In an optional implementation, that the terminal device stops RetransmissionTimer may be specifically: The terminal device stops RetransmissionTimer when receiving the indication message; or the terminal device stops RetransmissionTimer after receiving the indication message.

In an optional implementation, if RetransmissionTimer is running, the terminal device may further reset RetransmissionTimer (the terminal device stops and resets RetransmissionTimer), in other words, set a value of RetransmissionTimer to an initial value (for example, 0). In this way, when RetransmissionTimer needs to be started next time, RetransmissionTimer may be enabled to start timing from 0, to avoid affecting a normal procedure.

According to the sleep method for the terminal device that is provided in this embodiment of this application, if the terminal device receives the indication message, and onDurationTimer is running, the terminal device stops onDurationTimer. Therefore, the network device may stop onDurationTimer in time when determining that the terminal device does not transmit data subsequently, so that the terminal device goes to sleep and does not need to keep awake to receive a message. In other words, according to the foregoing method, the terminal device may go to sleep in time, so that power consumption can be better reduced, thereby meeting a power consumption reduction requirement.

Figure 14:
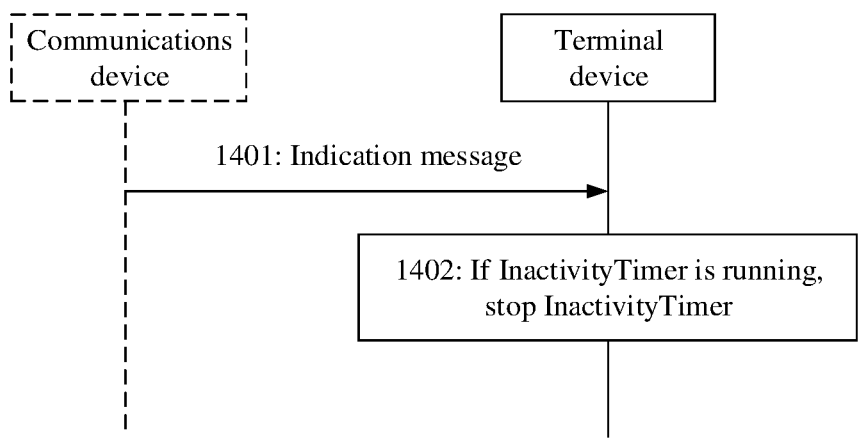
FIG. 14 is a flowchart of another sleep method for a terminal device according to this application.

According to the foregoing embodiments, an embodiment of this application further provides a sleep method for a terminal device, and the method is applicable to the communications system shown in FIG. 2. Referring to FIG. 14, a specific procedure of the method includes the following steps.

Step 1401: The terminal device receives an indication message, where the indication message is used to indicate the terminal device to stop a specific timer, and DRX is configured for the terminal device.

Specifically, step 1401 is similar to step 1301 in the embodiment shown in FIG. 13. For details, refer to the descriptions in step 1301, and repeated parts are not described herein again.

Step 1402: If InactivityTimer is running, the terminal device stops InactivityTimer.

In an optional implementation, that the terminal device stops InactivityTimer may be specifically: The terminal device stops InactivityTimer when receiving the indication message; or the terminal device stops InactivityTimer after receiving the indication message.

In an optional implementation, if InactivityTimer is running, the terminal device may further reset InactivityTimer (the terminal device stops and resets InactivityTimer), in other words, set a value of InactivityTimer to an initial value (for example, 0). In this way, when InactivityTimer needs to be started next time, InactivityTimer may be enabled to start timing from 0, to avoid affecting a normal procedure.

In an optional implementation, if RetransmissionTimer is running, the terminal device stops RetransmissionTimer. RetransmissionTimer may be RetransmissionTimerUL and/or RetransmissionTimerDL. For detailed descriptions of RetransmissionTimer and detailed descriptions of stopping RetransmissionTimer by the terminal device, refer to the related descriptions in step 1302 in the embodiment shown in FIG. 13, and repeated parts are not described herein again.

According to the sleep method for the terminal device that is provided in this embodiment of this application, if the terminal device receives the indication message, and InactivityTimer is running, the terminal device stops InactivityTimer. Therefore, a network device may stop InactivityTimer in time when determining that the terminal device does not transmit data subsequently, so that the terminal device goes to sleep and does not need to keep awake to receive a message. In other words, according to the foregoing method, the terminal device may go to sleep in time, so that power consumption can be better reduced, thereby meeting a power consumption reduction requirement.

Figure 15:
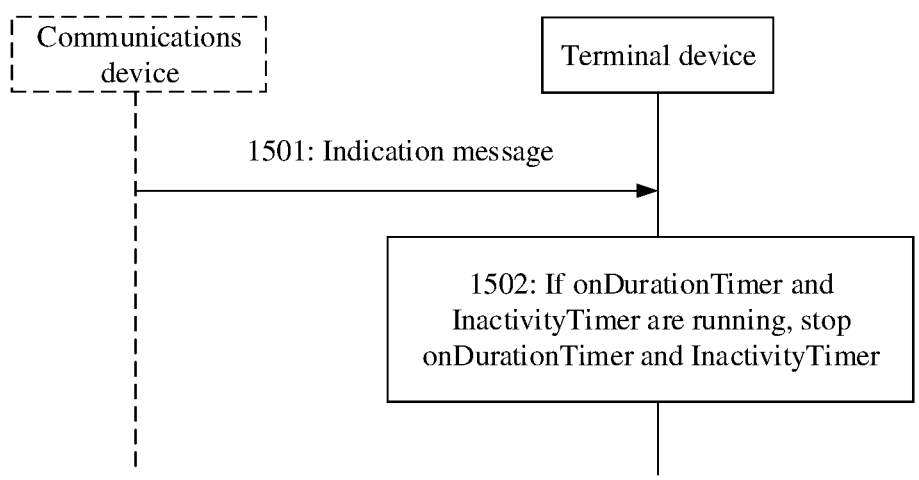
FIG. 15 is a flowchart of another sleep method for a terminal device according to this application.

According to the foregoing embodiments, an embodiment of this application further provides a sleep method for a terminal device, and the method is applicable to the communications system shown in FIG. 2. Referring to FIG. 15, a specific procedure of the method includes the following steps.

Step 1501: The terminal device receives an indication message, where the indication message is used to indicate the terminal device to stop a specific timer, and DRX is configured for the terminal device.

Specifically, step 1501 is similar to step 1301 in the embodiment shown in FIG. 13. For details, refer to the descriptions in step 1301, and repeated parts are not described herein again.

Step 1502: If onDurationTimer and InactivityTimer are running, the terminal device stops onDurationTimer and InactivityTimer.

In an optional implementation, for details of stopping onDurationTimer and InactivityTimer by the terminal device, refer to the related descriptions of stopping onDurationTimer by the terminal device in step 1302 and the related descriptions of stopping InactivityTimer by the terminal device in step 1402, and repeated parts are not described herein again.

In an optional implementation, if RetransmissionTimer is running, the terminal device stops RetransmissionTimer. RetransmissionTimer may be RetransmissionTimerUL and/or RetransmissionTimerDL. For detailed descriptions of RetransmissionTimer and detailed descriptions of stopping RetransmissionTimer by the terminal device, refer to the related descriptions in step 1302 in the embodiment shown in FIG. 13, and repeated parts are not described herein again.

According to the sleep method for the terminal device that is provided in this embodiment of this application, if the terminal device receives the indication message, and onDurationTimer and InactivityTimer are running, the terminal device stops onDurationTimer and InactivityTimer. Therefore, a network device may stop onDurationTimer and InactivityTimer in time when determining that the terminal device does not transmit data subsequently, so that the terminal device goes to sleep and does not need to keep awake to receive a message. In other words, according to the foregoing method, the terminal device may go to sleep in time, so that power consumption can be better reduced, thereby meeting a power consumption reduction requirement.

In the foregoing embodiments provided in this application, the solutions of the sleep methods for the terminal device that are provided in the embodiments of this application are separately described from the perspective of interaction between network elements or devices. It may be understood that, to implement the foregoing functions, each network element or device such as the terminal device includes a corresponding hardware structure and/or software module to perform each function. A person skilled in the art should easily be aware that, in combination with units and algorithm steps of the examples described in the embodiments disclosed in this application, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

For example, when the terminal device provided in this application implements a corresponding function by using a software module, the terminal device may include a receiving unit 1601 and a processing unit 1602. For details, refer to a schematic structural diagram shown in FIG. 16.

Figure 16:
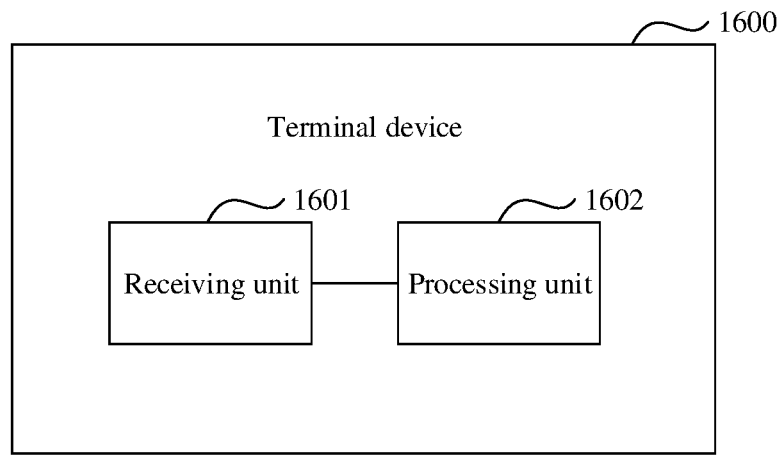
FIG. 16 is a schematic structural diagram of a terminal device according to this application.

In an embodiment, the terminal device shown in FIG. 16 may be configured to perform the operations of the terminal device in the embodiments shown in FIG. 3, FIG. 7, and FIG. 8. Examples are as follows:

The receiving unit 1601 is configured to receive a signal. The processing unit 1602 is configured to: in a case in which the receiving unit 1601 receives no wake-up indication signal within a preset time, if an activity timer InactivityTimer is running, stop InactivityTimer; or if a retransmission timer RetransmissionTimer is running, stop RetransmissionTimer; or if InactivityTimer and RetransmissionTimer are running, stop InactivityTimer and RetransmissionTimer, where discontinuous reception DRX is configured for the terminal device.

In an optional implementation, when receiving no wake-up indication signal within the preset time, the receiving unit 1601 is specifically configured to: receive a go-to-sleep signal within the preset time; or skip receiving a wake-up signal within the preset time; or receive an indication signal within the preset time, where the indication signal includes go-to-sleep indication information.

In an optional implementation, when stopping InactivityTimer, the processing unit 1602 is specifically configured to stop InactivityTimer when a next DRX cycle of a (current) DRX cycle starts.

In an optional implementation, when stopping RetransmissionTimer, the processing unit 1602 is specifically configured to stop RetransmissionTimer when a next DRX cycle of a (current) DRX cycle starts.

In an optional implementation, the processing unit 1602 is further configured to: if InactivityTimer is running, reset InactivityTimer; or if RetransmissionTimer is running, reset RetransmissionTimer; or if InactivityTimer and RetransmissionTimer are running, reset InactivityTimer and RetransmissionTimer.

In an optional implementation, RetransmissionTimer is an uplink retransmission timer RetransmissionTimerUL and/or a downlink retransmission timer RetransmissionTimerDL.

In an optional implementation, the processing unit 1602 is further configured to stop InactivityTimer, and start or restart a short cycle timer ShortCycleTimer.

In an optional implementation, the processing unit 1602 is further configured to stop InactivityTimer, and use a long DRX cycle.

In an optional implementation, the processing unit 1602 is further configured to: if a short cycle timer ShortCycleTimer is running, stop ShortCycleTimer, or stop and reset ShortCycleTimer.

According to the foregoing terminal device, if the terminal device receives no wake-up indication signal within the preset time, and InactivityTimer and/or RetransmissionTimer are/is running, the terminal device stops InactivityTimer and/or RetransmissionTimer. This can avoid the following case in the prior art: If InactivityTimer and/or RetransmissionTimer are/is running, even if the terminal device is indicated to go to sleep, the terminal device still needs to remain active for a period of time until the end of the timers/timer. In other words, according to the foregoing method, the terminal device may actually sleep, so that power consumption can be better reduced, thereby meeting a power consumption reduction requirement.

In another embodiment, the terminal device shown in FIG. 16 may be further configured to perform the operations of the terminal device in the embodiment shown in FIG. 9. Examples are as follows.

The receiving unit 1601 is configured to receive a go-to-sleep indication signal from a communications device. The processing unit 1602 is configured to start or restart a sleep timer, and sleep during running of the sleep timer, where that the processing unit 1602 sleeps during running of the sleep timer includes: skipping monitoring a physical downlink control channel PDCCH during running of the sleep timer.

In an optional implementation, that the processing unit 1602 sleeps during running of the sleep timer further includes:

skipping sending a type-0-triggered sounding reference signal type-0-triggered SRS during running of the sleep timer; or skipping reporting channel state information CSI during running of the sleep timer; or skipping sending the type-0-triggered SRS and skipping reporting the CSI during running of the sleep timer.

In an optional implementation, when receiving the go-to-sleep indication signal from the communications device, the receiving unit 1601 is specifically configured to: receive a go-to-sleep signal from the communications device; or receive an indication signal from the communications device, where the indication signal includes go-to-sleep indication information.

In an optional implementation, before receiving the go-to-sleep indication signal from the communications device, the receiving unit 1601 is further configured to receive sleep duration configured by the communications device.

In an optional implementation, the signal includes indication information, and the indication information indicates sleep duration.

In an optional implementation, before receiving the go-to-sleep indication signal from the communications device, the receiving unit 1601 is further configured to receive at least one piece of duration configured by the communications device, where the sleep duration is one of the at least one piece of duration.

In an optional implementation, before starting or restarting the sleep timer, the processing unit 1602 is further configured to configure timing duration of the sleep timer as the sleep duration.

According to the foregoing terminal device, after receiving the go-to-sleep indication signal from the communications device, the terminal device starts or restarts the sleep timer, and sleeps during running of the sleep timer. That the terminal device sleeps during running of the sleep timer includes: The terminal device does not monitor the PDCCH during running of the sleep timer. According to the foregoing method, the terminal device may actually sleep, so that power consumption can be better reduced, thereby meeting a power consumption reduction requirement.

In another embodiment, the terminal device shown in FIG. 16 may be further configured to perform the operations of the terminal device in the embodiments shown in FIG. 10, FIG. 11, and FIG. 12. Examples are as follows.

The receiving unit 1601 is configured to receive a signal. The processing unit 1602 is configured to: in a case in which the receiving unit 1601 receives a go-to-sleep indication signal, if an activity timer InactivityTimer is running, stop InactivityTimer; or if a retransmission timer RetransmissionTimer is running, stop RetransmissionTimer; or if InactivityTimer and RetransmissionTimer are running, stop InactivityTimer and RetransmissionTimer, where discontinuous reception DRX is configured for the terminal device.

In an optional implementation, when receiving the go-to-sleep indication signal, the receiving unit 1601 is specifically configured to: receive a go-to-sleep signal; or receive an indication signal, where the indication signal includes go-to-sleep indication information.

In an optional implementation, when stopping InactivityTimer, the processing unit 1602 is specifically configured to stop InactivityTimer when a next DRX cycle of a (current) DRX cycle starts.

In an optional implementation, when stopping RetransmissionTimer, the processing unit 1602 is specifically configured to stop RetransmissionTimer when a next DRX cycle of a (current) DRX cycle starts.

In an optional implementation, the processing unit 1602 is further configured to: if InactivityTimer is running, reset InactivityTimer; or if RetransmissionTimer is running, reset RetransmissionTimer; or if InactivityTimer and RetransmissionTimer are running, reset InactivityTimer and RetransmissionTimer.

In an optional implementation, RetransmissionTimer is an uplink retransmission timer RetransmissionTimerUL and/or a downlink retransmission timer RetransmissionTimerDL.

In an optional implementation, the processing unit 1602 is further configured to stop InactivityTimer, and start or restart a short cycle timer ShortCycleTimer.

In an optional implementation, the processing unit 1602 is further configured to stop InactivityTimer, and use a long DRX cycle.

In an optional implementation, the processing unit 1602 is further configured to: if ShortCycleTimer is running, stop ShortCycleTimer, or stop and reset ShortCycleTimer.

According to the foregoing terminal device, if the terminal device receives the go-to-sleep indication signal, and InactivityTimer and/or RetransmissionTimer are/is running, the terminal device stops InactivityTimer and/or RetransmissionTimer. This can avoid the following case in the prior art: If InactivityTimer and/or RetransmissionTimer are/is running, even if the terminal device is indicated to go to sleep, the terminal device still needs to remain active for a period of time until the end of the timers/timer. In other words, according to the foregoing method, the terminal device may actually sleep, so that power consumption can be better reduced, thereby meeting a power consumption reduction requirement.

In another embodiment, the terminal device shown in FIG. 16 may be further configured to perform the operations of the terminal device in the embodiments shown in FIG. 13, FIG. 14, and FIG. 15. Examples are as follows.

The receiving unit 1601 is configured to receive an indication message, where the indication message is used to indicate the terminal device to stop a specific timer, and discontinuous reception DRX is configured for the terminal device.

The processing unit 1602 is configured to: if an on-duration timer onDurationTimer is running, stop onDurationTimer; or if an activity timer InactivityTimer is running, stop InactivityTimer; or if onDurationTimer and InactivityTimer are running, stop onDurationTimer and InactivityTimer.

In an optional implementation, the processing unit 1602 is further configured to: if onDurationTimer is running, reset onDurationTimer; or if InactivityTimer is running, reset InactivityTimer.

In an optional implementation, the processing unit 1602 is further configured to: if a retransmission timer RetransmissionTimer is running, stop RetransmissionTimer. The RetransmissionTimer is an uplink retransmission timer RetransmissionTimerUL and/or a downlink retransmission timer RetransmissionTimerDL.

In an optional implementation, the processing unit 1602 is further configured to: if RetransmissionTimer is running, reset RetransmissionTimer.

In an optional implementation, the indication message is a physical layer sequence, DCI, a MAC CE, or a MAC PDU.

In an optional implementation, when receiving the indication message, the receiving unit 1601 is specifically configured to receive the indication message when the processing unit 1602 uses a long DRX cycle.

In an optional implementation, the processing unit 1602 is further configured to continue to use the long DRX cycle.

In an optional implementation, when receiving the indication message, the receiving unit 1601 is specifically configured to receive the indication message when the processing unit 1602 uses a short DRX cycle.

In an optional implementation, the processing unit 1602 is further configured to continue to use the short DRX cycle.

In an optional implementation, the processing unit 1602 is further configured to skip starting or restarting a short cycle timer ShortCycleTimer.

According to the foregoing terminal device, if the terminal device receives the indication message, and onDurationTimer and/or InactivityTimer are/is running, the terminal device stops onDurationTimer and/or InactivityTimer. Therefore, when a network device determines that the terminal device does not transmit data subsequently, onDurationTimer and/or InactivityTimer are/is stopped in time, so that the terminal device sleeps and does not need to keep awake to receive a message. In other words, according to the foregoing method, the terminal device may go to sleep in time, so that power consumption can be better reduced, thereby meeting a power consumption reduction requirement.

It should be noted that, in the embodiments of this application, unit division is an example and is merely logical function division, and may be other division during actual implementation. Function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for indicating a computer device (which may be a personal computer, a server, a network device, or the like) or a processor (processor) to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

Figure 17:
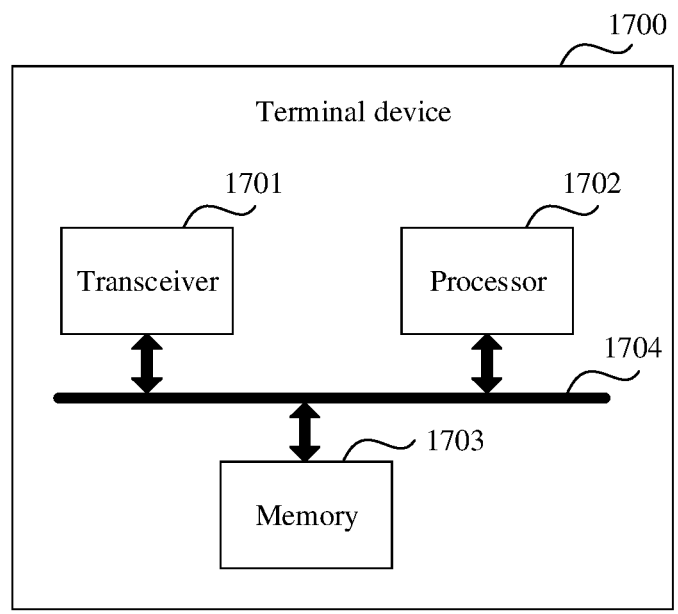
FIG. 17 is a structural diagram of a terminal device according to this application.

For another example, when the terminal device implements a corresponding function by using hardware, the terminal device may include a transceiver 1701 and a processor 1702, and optionally, may further include a memory 1703. For details, refer to a structural diagram shown in FIG. 17. It should be understood that the terminal device may include at least one processor and at least one memory. FIG. 17 shows only an example of one processor and one memory.

The processor 1702 may be a central processing unit (CPU), a network processor (NP), a combination of a CPU and an NP, or the like. The processor 1702 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof. The processor 1702 may implement the foregoing functions by hardware or certainly by hardware executing corresponding software.

The transceiver 1701 and the processor 1702 are connected to each other. Optionally, the transceiver 1701 and the processor 1702 are connected to each other through a bus 1704. The bus 1704 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 17, but this does not mean that there is only one bus or only one type of bus.

In an embodiment, the terminal device shown in FIG. 17 may be configured to perform the operations of the terminal device in the embodiments shown in FIG. 3, FIG. 7, and FIG. 8. Examples are as follows.

The transceiver 1701 is configured to receive and send a signal when being invoked by the processor 1702. The processor 1702 is configured to: in a case in which the transceiver 1701 receives no wake-up indication signal within a preset time, if an activity timer InactivityTimer is running, stop InactivityTimer; or if a retransmission timer RetransmissionTimer is running, stop RetransmissionTimer; or if InactivityTimer and RetransmissionTimer are running, stop InactivityTimer and RetransmissionTimer, where discontinuous reception DRX is configured for the terminal device.

In an optional implementation, when receiving no wake-up indication signal within the preset time, the transceiver 1701 is specifically configured to: receive a go-to-sleep signal within the preset time; or skip receiving a wake-up signal within the preset time; or receive an indication signal within the preset time, where the indication signal includes go-to-sleep indication information.

In an optional implementation, when stopping InactivityTimer, the processor 1702 is specifically configured to stop InactivityTimer when a next DRX cycle of a (current) DRX cycle starts.

In an optional implementation, when stopping RetransmissionTimer, the processor 1702 is specifically configured to stop RetransmissionTimer when a next DRX cycle of a (current) DRX cycle starts.

In an optional implementation, the processor 1702 is further configured to: if InactivityTimer is running, reset InactivityTimer; or if RetransmissionTimer is running, reset RetransmissionTimer; or if InactivityTimer and RetransmissionTimer are running, reset InactivityTimer and RetransmissionTimer.

In an optional implementation, RetransmissionTimer is an uplink retransmission timer RetransmissionTimerUL and/or a downlink retransmission timer RetransmissionTimerDL.

In an optional implementation, the processor 1702 is further configured to stop InactivityTimer, and start or restart a short cycle timer ShortCycleTimer.

In an optional implementation, the processor 1702 is further configured to stop InactivityTimer, and use a long DRX cycle.

In an optional implementation, the processor 1702 is further configured to: if a short cycle timer ShortCycleTimer is running, stop ShortCycleTimer, or stop and reset ShortCycleTimer.

In an optional implementation, the memory 1703 is coupled to the processor 1702, and is configured to store a program and the like. Specifically, the program may include program code, and the program code includes a computer operation instruction. The memory 1703 may include a RAM, or may include a nonvolatile memory (non-volatile memory), for example, at least one magnetic disk memory. The processor 1702 executes the application program stored in the memory 1703, to implement the foregoing functions, so as to implement the sleep methods for the terminal device shown in FIG. 3, FIG. 7, and FIG. 8.

According to the foregoing terminal device, if the terminal device receives no wake-up indication signal within the preset time, and InactivityTimer and/or RetransmissionTimer are/is running, the terminal device stops InactivityTimer and/or RetransmissionTimer. This can avoid the following case in the prior art: If InactivityTimer and/or RetransmissionTimer are/is running, even if the terminal device is indicated to go to sleep, the terminal device still needs to remain active for a period of time until the end of the timers/timer. In other words, according to the foregoing method, the terminal device may actually sleep, so that power consumption can be better reduced, thereby meeting a power consumption reduction requirement.

In another embodiment, the terminal device shown in FIG. 17 may be further configured to perform the operations of the terminal device in the embodiment shown in FIG. 9. Examples are as follows.

The transceiver 1701 is configured to receive a go-to-sleep indication signal from a communications device when being invoked by the processor 1702. The processor 1702 is configured to start or restart a sleep timer, and sleep during running of the sleep timer, where that the processor 1702 sleeps during running of the sleep timer includes: skipping monitoring a PDCCH during running of the sleep timer.

In an optional implementation, that the processor 1702 sleeps during running of the sleep timer further includes:
skipping sending a type-0-triggered sounding reference signal type-0-triggered SRS during running of the sleep timer; or skipping reporting channel state information CSI during running of the sleep timer; or skipping sending the type-0-triggered SRS and skipping reporting the CSI during running of the sleep timer.

In an optional implementation, when receiving the go-to-sleep indication signal from the communications device, the transceiver 1701 is specifically configured to: receive a go-to-sleep signal from the communications device; or receive an indication signal from the communications device, where the indication signal includes go-to-sleep indication information.

In an optional implementation, before receiving the go-to-sleep indication signal from the communications device, the transceiver 1701 is further configured to receive sleep duration configured by the communications device.

In an optional implementation, the signal includes indication information, and the indication information indicates sleep duration.

In an optional implementation, before receiving the go-to-sleep indication signal from the communications device, the transceiver 1701 is further configured to receive at least one piece of duration configured by the communications device, where the sleep duration is one of the at least one piece of duration.

In an optional implementation, before starting or restarting the sleep timer, the processor 1702 is further configured to configure timing duration of the sleep timer as the sleep duration.

In an optional implementation, the memory 1703 is coupled to the processor 1702, and is configured to store a program and the like. Specifically, the program may include program code, and the program code includes a computer operation instruction. The memory 1703 may include a RAM, or may include a nonvolatile memory (non-volatile memory), for example, at least one magnetic disk memory. The processor 1702 executes the application program stored in the memory 1703, to implement the foregoing functions, so as to implement the sleep method for the terminal device shown in FIG. 9.

According to the foregoing terminal device, after receiving the go-to-sleep indication signal from the communications device, the terminal device starts or restarts the sleep timer, and sleeps during running of the sleep timer. That the terminal device sleeps during running of the sleep timer includes: The terminal device does not monitor the PDCCH during running of the sleep timer. According to the foregoing method, the terminal device may actually sleep, so that power consumption can be better reduced, thereby meeting a power consumption reduction requirement.

In another embodiment, the terminal device shown in FIG. 17 may be further configured to perform the operations of the terminal device in the embodiments shown in FIG. 10, FIG. 11, and FIG. 12. Examples are as follows The transceiver 1701 is configured to receive a signal when being invoked by the processor 1702. The processor 1702 is configured to: in a case in which the transceiver 1701 receives a go-to-sleep indication signal, if an activity timer InactivityTimer is running, stop InactivityTimer; or if a retransmission timer RetransmissionTimer is running, stop RetransmissionTimer; or if InactivityTimer and RetransmissionTimer are running, stop InactivityTimer and RetransmissionTimer, where discontinuous reception DRX is configured for the terminal device.

In an optional implementation, when receiving the go-to-sleep indication signal, the transceiver 1701 is specifically configured to: receive a go-to-sleep signal; or receive an indication signal, where the indication signal includes go-to-sleep indication information.

In an optional implementation, when stopping InactivityTimer, the processor 1702 is specifically configured to stop InactivityTimer when a next DRX cycle of a (current) DRX cycle starts.

In an optional implementation, when stopping RetransmissionTimer, the processor 1702 is specifically configured to stop RetransmissionTimer when a next DRX cycle of a (current) DRX cycle starts.

In an optional implementation, the processor 1702 is further configured to: if InactivityTimer is running, reset InactivityTimer; or if RetransmissionTimer is running, reset RetransmissionTimer; or if InactivityTimer and RetransmissionTimer are running, reset InactivityTimer and RetransmissionTimer.

In an optional implementation, RetransmissionTimer is an uplink retransmission timer RetransmissionTimerUL and/or a downlink retransmission timer RetransmissionTimerDL.

In an optional implementation, the processor 1702 is further configured to stop InactivityTimer, and start or restart a short cycle timer ShortCycleTimer.

In an optional implementation, the processor 1702 is further configured to stop InactivityTimer, and use a long DRX cycle.

In an optional implementation, the processor 1702 is further configured to: if ShortCycleTimer is running, stop ShortCycleTimer, or stop and reset ShortCycleTimer.

In an optional implementation, the memory 1703 is coupled to the processor 1702, and is configured to store a program and the like. Specifically, the program may include program code, and the program code includes a computer operation instruction. The memory 1703 may include a RAM, or may include a nonvolatile memory (non-volatile memory), for example, at least one magnetic disk memory. The processor 1702 executes the application program stored in the memory 1703, to implement the foregoing functions, so as to implement the sleep methods for the terminal device shown in FIG. 10, FIG. 11, and FIG. 12.

According to the foregoing terminal device, if the terminal device receives the go-to-sleep indication signal, and InactivityTimer and/or RetransmissionTimer are/is running, the terminal device stops InactivityTimer and/or RetransmissionTimer. This can avoid the following case in the prior art: If InactivityTimer and/or RetransmissionTimer are/is running, even if the terminal device is indicated to go to sleep, the terminal device still needs to remain active for a period of time until the end of the timers/timer. In other words, according to the foregoing method, the terminal device may actually sleep, so that power consumption can be better reduced, thereby meeting a power consumption reduction requirement.

In another embodiment, the terminal device shown in FIG. 17 may be further configured to perform the operations of the terminal device in the embodiments shown in FIG. 13, FIG. 14, and FIG. 15. Examples are as follows.

The transceiver 1701 is configured to receive an indication message when being invoked by the processor 1702, where the indication message is used to indicate the terminal device to stop a specific timer, and discontinuous reception DRX is configured for the terminal device.

The processor 1702 is configured to: if an on-duration timer onDurationTimer is running, stop onDurationTimer; or if an activity timer InactivityTimer is running, stop InactivityTimer; or if onDurationTimer and InactivityTimer are running, stop onDurationTimer and InactivityTimer.

In an optional implementation, the processor 1702 is further configured to: if onDurationTimer is running, reset onDurationTimer; or if InactivityTimer is running, reset InactivityTimer.

In an optional implementation, the processor 1702 is further configured to: if a retransmission timer RetransmissionTimer is running, stop RetransmissionTimer. The RetransmissionTimer is an uplink retransmission timer RetransmissionTimerUL and/or a downlink retransmission timer RetransmissionTimerDL.

In an optional implementation, the processor 1702 is further configured to: if RetransmissionTimer is running, reset RetransmissionTimer.

In an optional implementation, the indication message is a physical layer sequence, DCI, a MAC CE, or a MAC PDU.

In an optional implementation, when receiving the indication message, the transceiver 1701 is specifically configured to receive the indication message when the processor 1702 uses a long DRX cycle.

In an optional implementation, the processor 1702 is further configured to continue to use the long DRX cycle.

In an optional implementation, when receiving the indication message, the transceiver 1701 is specifically configured to receive the indication message when the processor 1702 uses a short DRX cycle.

In an optional implementation, the processor 1702 is further configured to continue to use the short DRX cycle.

In an optional implementation, the processor 1702 is further configured to skip starting or restarting a short cycle timer ShortCycleTimer.

In an optional implementation, the memory 1703 is coupled to the processor 1702, and is configured to store a program and the like. Specifically, the program may include program code, and the program code includes a computer operation instruction. The memory 1703 may include a RAM, or may include a nonvolatile memory (non-volatile memory), for example, at least one magnetic disk memory. The processor 1702 executes the application program stored in the memory 1703, to implement the foregoing functions, so as to implement the sleep methods for the terminal device shown in FIG. 13, FIG. 14, and FIG. 15.

According to the foregoing terminal device, if the terminal device receives the indication message, and onDurationTimer and/or InactivityTimer are/is running, the terminal device stops onDurationTimer and/or InactivityTimer. Therefore, when a network device determines that the terminal device does not transmit data subsequently, onDurationTimer and/or InactivityTimer are/is stopped in time, so that the terminal device sleeps and does not need to keep awake to receive a message. In other words, according to the foregoing method, the terminal device may go to sleep in time, so that power consumption can be better reduced, thereby meeting a power consumption reduction requirement.

Figure 18:
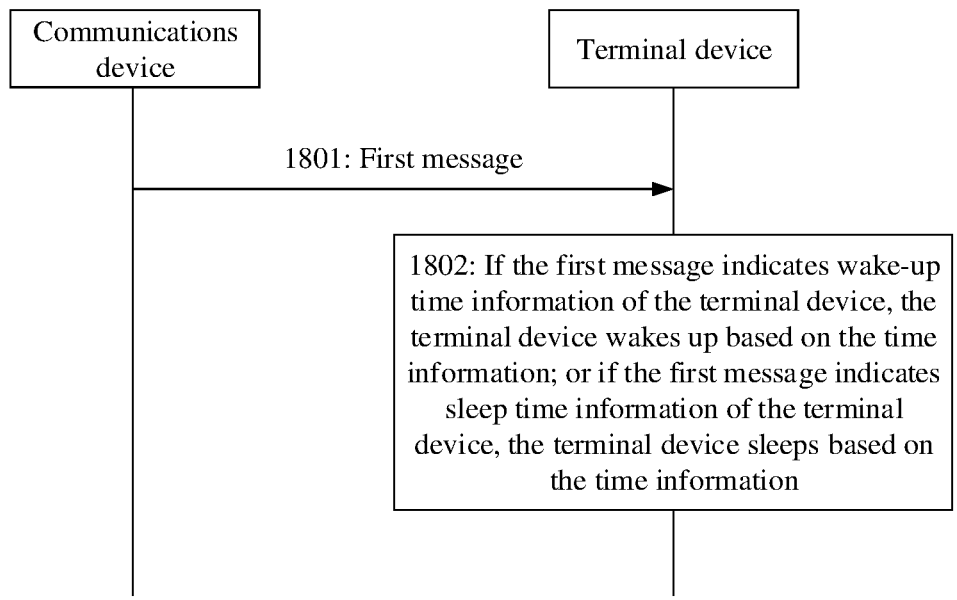
FIG. 18 is a flowchart of a state indication method for a terminal device according to this application.

According to the foregoing embodiments, an embodiment of this application further provides a state indication method for a terminal device, and the method is applicable to the communications system shown in FIG. 2. Referring to FIG. 18, a specific procedure of the method includes the following steps.

Step 1801: The terminal device receives a first message from a communications device, where the first message indicates wake-up or sleep time information of the terminal device.

In an optional implementation, the communications device may be a network device such as a base station, or may be another device such as a terminal device.

In an optional implementation, the first message may indicate the terminal device to wake up or go to sleep, and the first message is associated with the time information, so that the first message can indicate the wake-up or sleep time information of the terminal device. For example, the communications device may configure the time information associated with the first message for the terminal device by using a broadcast message, an RRC dedicated message, or another message, or the time information associated with the first message may be preset and stored in the terminal device. For example, if the first message may be a wake-up signal (wake-up signal), the first message may indicate the terminal device to wake up, and the first message may indicate the wake-up time information of the terminal device with reference to the time information associated with the first message. For another example, if the first message may be a go-to-sleep signal, the first message may indicate the terminal device to go to sleep, and the first message may indicate the sleep time information of the terminal device with reference to the time information associated with the first message.

In another optional implementation, the first message may include first indication information, and the first indication information indicates the time information. In this implementation, the first message may indicate the terminal device to wake up or go to sleep, and the first indication information included in the first message is used to indicate the time information. With reference to an attribute of the first message and the first indication information in the first message, the first message may indicate the wake-up or sleep time information of the terminal device. For example, if the first message is a wake-up signal, the first message may indicate the terminal device to wake up, and the first message may indicate the wake-up time information of the terminal device with reference to the first indication information in the first message. For another example, if the first message is a go-to-sleep signal, the first message may indicate the terminal device to go to sleep, and the first message may indicate the sleep time information of the terminal device with reference to the first indication information in the first message.

In still another optional implementation, the first message may include second indication information, and the second indication information indicates the terminal device to wake up or go to sleep. In this implementation, the first message may be associated with the time information. For example, the communications device configures the time information associated with the first message for the terminal device by using a broadcast message, an RRC dedicated message, or another message, or the time information associated with the first message may be preset and stored in the terminal device. For example, if the second indication information in the first message indicates the terminal device to wake up, the first message may indicate the wake-up time information of the terminal device with reference to the time information associated with the first message. For another example, if the second indication information in the first message indicates the terminal device to go to sleep, the first message may indicate the sleep time information of the terminal device with reference to the time information associated with the first message.

In still another optional implementation, the first message may include first indication information and second indication information, the first indication information indicates the time information, and the second indication information indicates the terminal device to wake up or go to sleep. In this implementation, the first message cannot indicate the terminal device to wake up or go to sleep. With reference to the second indication information and the first indication information in the first message, the first message may indicate the wake-up or sleep time information of the terminal device. For example, if the second indication information in the first message indicates the terminal device to wake up, the first message may indicate the wake-up time information of the terminal device with reference to the first indication information in the first message. For another example, if the second indication information in the first message indicates the terminal device to go to sleep, the first message may indicate the sleep time information of the terminal device with reference to the first indication information in the first message.

In an optional implementation, the time information may be a time length in which the terminal device keeps awake or sleeping, which may be understood as a time length in which the terminal device keeps awake or sleeping when (or after) receiving the first message. For example, the terminal device is in a wake-up state in a time period from a time point at which (or after) the terminal device receives the first message to a time point at which a wake-up time length ends. For another example, the terminal device is in a sleep state in a time period from a time point at which (or after) the terminal device receives the first message to a time point at which a sleep time length ends. It should be noted that a time point at which the terminal device starts to wake up or go to sleep based on the first message may be a moment that immediately starts when (or after) the terminal device receives the first message, or may be another pre-specified time point. The time length in which the terminal device keeps awake or sleeping may be calculated starting from a time point at which the terminal device starts to wake up or go to sleep. This is not limited in this application.

In another optional implementation, the time information may be a time length before the terminal device wakes up or goes to sleep, which may be understood as a time length from a time point at which (or after) the terminal device receives the first message to a time point at which the terminal device starts to wake up or go to sleep. In other words, when (or after) receiving the first message, the terminal device does not immediately wake up or go to sleep, but wakes up or goes to sleep after a time period (that is, the time length).

In still another optional implementation, the time information may be a time at which wake-up or sleep of the terminal device ends, which may be understood as a time point at which wake-up or sleep of the terminal device ends when (or after) the terminal device receives the first message, for example, a time in which the terminal device starts to wake up and keeps awake, and the awake ends when (or after) the terminal device receives the first message, or a time in which the terminal device starts to go to sleep and keeps sleeping, and the sleep ends when (or after) the terminal device receives the first message. It should be noted that a time at which the terminal device starts to wake up or go to sleep based on the first message may be a moment that immediately starts when (or after) the terminal device receives the first message, or may be another pre-specified time point. The time length in which the terminal device keeps awake or sleeping may be calculated starting from a time point at which the terminal device starts to wake up or go to sleep. This is not limited in this application.

In an optional implementation, the time length may be one or more milliseconds; or the time length may be one or more subframes; or the time length may be one or more slots; or the time length may be one or more DRX cycles; or the time length may be one or more pieces of "On Duration"; or the time length may be one or more paging occasions; or the time length may be one or more PDCCH monitoring occasions; or the time length may be a time length in a unit of a millisecond; or the time length may be a time length in a unit of a subframe; or the time length may be a time length in a unit of a slot; or the time length may be a time length in a unit of a DRX cycle; or the time length may be a time length in a unit of an amount of "On Duration"; or the time length may be a time length in a unit of a paging occasion; or the time length may be a time length in a unit of a PDCCH monitoring occasion. For example, the time length is one or more "xx", and the time length is a time length in a unit of "xx". In a specific scenario, the foregoing two descriptions may be considered to be equivalent, where "xx" is the foregoing millisecond or the like. For example, when the time length is one or more pieces of "On Duration" or a time length in a unit of an amount of "On Duration", the time length may be N (N is an integer greater than or equal to 1) pieces of "On Duration", which indicates that the terminal device keeps awake or sleeping in the subsequent N pieces of "On Duration" starting from a time point at which wake-up or go-to-sleep starts.

In an optional implementation, that the first indication information indicates the time information may be specifically: The first indication information indicates a value of the time information. For example, the first indication information indicates a value of the time length in which the terminal device keeps awake or sleeping (for example, N milliseconds or N pieces of duration, where N is an integer greater than or equal to 1). For another example, the first indication information indicates a value of the time length before the terminal device wakes up or goes to sleep (for example, N milliseconds or N pieces of duration). For another example, the first indication information indicates a value of the time point at which wake-up or sleep of the terminal device ends.

In another optional implementation, that the first indication information indicates the time information may be specifically: The first indication information indicates an index value, and the index value corresponds to a value of the time information. For example, the index value corresponds to a value of the time length in which the terminal device keeps awake or sleeping (for example, N milliseconds or N pieces of duration); or the index value corresponds to a value of the time length before the terminal device wakes up or goes to sleep (for example, N milliseconds or N pieces of duration); or the index value corresponds to a value of the time point at which wake-up or sleep of the terminal device ends. A correspondence between the index value and the value of the time information may be preconfigured by the communications device for the terminal device. For example, the communications device may configure the correspondence for the terminal device by using a broadcast message, an RRC dedicated message, or another message, or the correspondence between the index value and the value of the time information may be preset and stored in the terminal device. For example, index values {1, 2, 3} respectively correspond to values of the time information {a, b, c}. When the first indication information indicates an index value 1, it is considered that a value of the time information indicated by the first indication information is a.

In an optional implementation, the first message may be a MAC PDU, or the first message may be a MAC CE (the MAC CE is a part of the MAC PDU). In this case, the first message may be implemented in the following plurality of manners.

Figure 19:
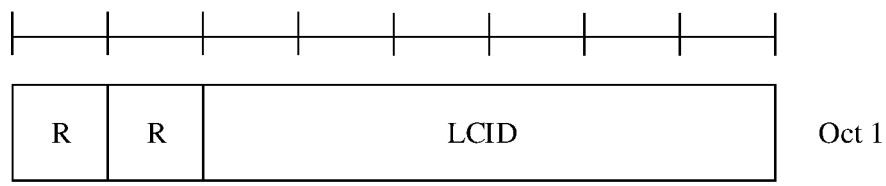
FIG. 19 is a schematic diagram of a first message according to this application.

In an example implementation, when the first message is a MAC CE, by using a logical channel identifier (LCID) in a medium access control subheader MAC subheader, it may be learned that a corresponding MAC CE is the first message. The LCID may be a newly introduced LCID, or may be obtained by reusing an existing LCID. This is not limited in this application. For example, a schematic diagram of a MAC subheader format may be shown in FIG. 19.

Figure 20:
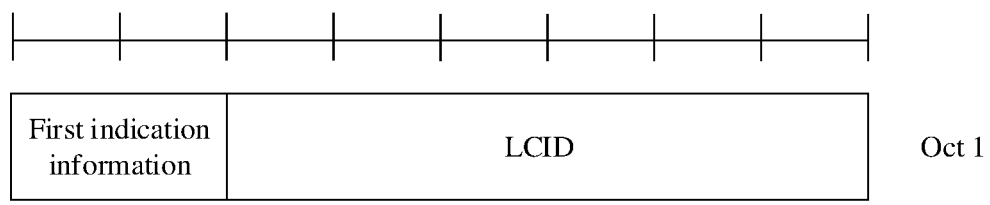
FIG. 20 is a schematic diagram of a first message according to this application.
Figure 21:
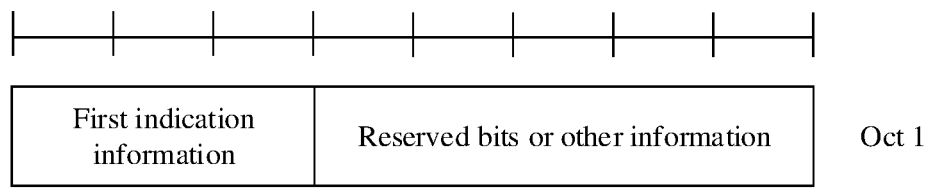
FIG. 21 is a schematic diagram of a first message according to this application.

In another example implementation, the first indication information may be carried in a MAC subheader of the MAC PDU, or the first indication information may be carried in a MAC CE of the MAC PDU. For example, when the first message is a MAC CE, by using an LCID in a medium access control subheader MAC subheader, it may be learned that a corresponding MAC CE is the first message. The LCID may be a newly introduced LCID, or may be obtained by reusing an existing LCID. For example, as shown in FIG. 20, when the first indication information is carried in the MAC subheader of the MAC PDU, the first indication information may occupy two bits in the MAC subheader. For another example, as shown in FIG. 21, when the first indication information is carried in the MAC CE of the MAC PDU, the first indication information may occupy four bits in the MAC CE. It should be noted that a specific quantity of bits occupied by the first indication information is not limited in this application. To ensure that a length of the MAC CE is in a unit of a byte (eight bits), a remaining bit may be a reserved bit, a padding bit, or another information bit.

Figure 22:
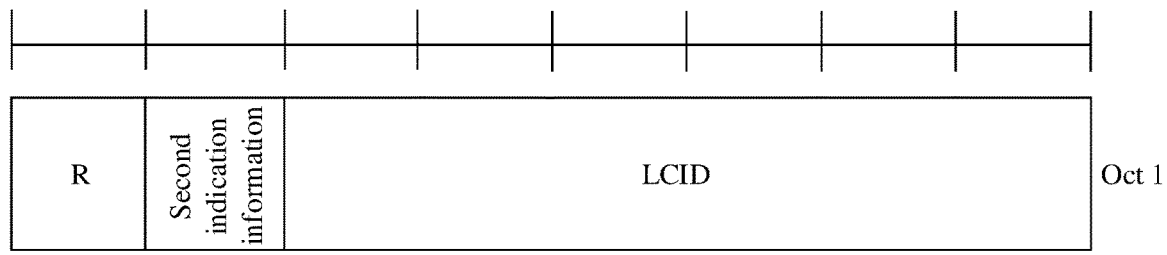
FIG. 22 is a schematic diagram of a first message according to this application.
Figure 23:
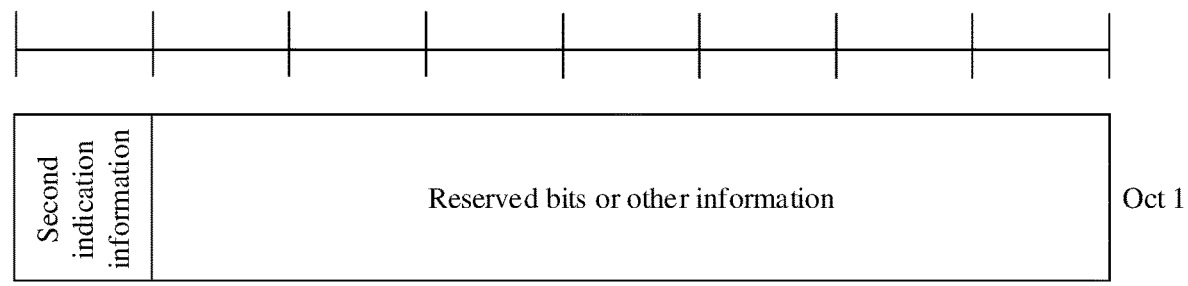
FIG. 23 is a schematic diagram of a first message according to this application.

In another example implementation, the second indication information may be carried in a MAC subheader of the MAC PDU, or the second indication information may be carried in a MAC CE of the MAC PDU. For example, when the first message is a MAC CE, by using an LCID in a medium access control subheader MAC subheader, it may be learned that a corresponding MAC CE is the first message. The LCID may be a newly introduced LCID, or may be obtained by reusing an existing LCID. For example, as shown in FIG. 22, when the second indication information is carried in the MAC subheader of the MAC PDU, the second indication information may occupy one bit in the MAC subheader. For another example, as shown in FIG. 23, when the second indication information is carried in the MAC CE of the MAC PDU, the second indication information may occupy one bit in the MAC CE. It should be noted that a specific quantity of bits occupied by the second indication information is not limited in this application. To ensure that a length of the MAC CE is in a unit of a byte (eight bits), a remaining bit may be a reserved bit, a padding bit, or another information bit.

Figure 24:
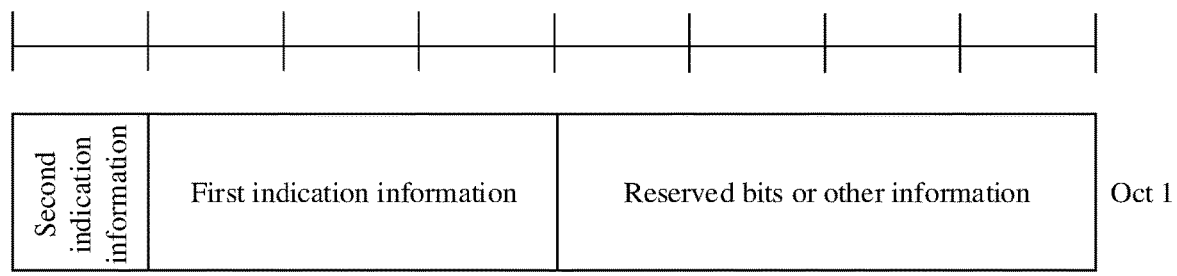
FIG. 24 is a schematic diagram of a first message according to this application.
Figure 25A:
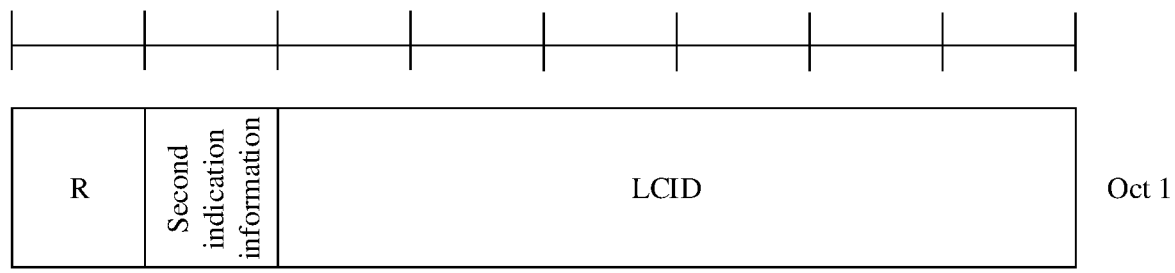
FIG. 25(a) and FIG. 25(b) are a schematic diagram of a first message according to this application.
Figure 25B:
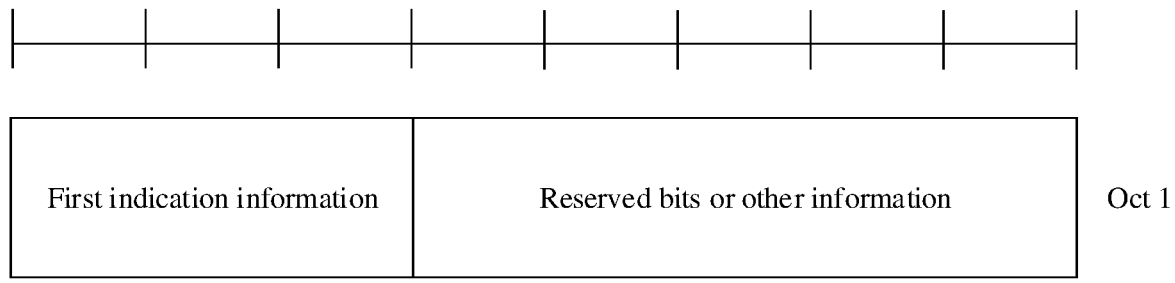

In another example implementation, when the first message includes the first indication information and the second indication information, the first indication information may be carried in a MAC subheader of the MAC PDU or the first indication information may be carried in a MAC CE of the MAC PDU, and the second indication information may be carried in the MAC subheader of the MAC PDU or the second indication information may be carried in the MAC CE of the MAC PDU. In other words, a location carrying manner of the first indication information and a location carrying manner of the second indication information may be combined. For a specific location of carrying the first indication information or the second indication information, refer to the method in the foregoing implementation. For example, when the first message is a MAC CE, by using an LCID in a medium access control subheader MAC subheader, it may be learned that a corresponding MAC CE is the first message. The LCID may be a newly introduced LCID, or may be obtained by reusing an existing LCID. For example, as shown in FIG. 24, when both the first indication information and the second indication information are carried in the MAC CE of the MAC PDU, the first indication information may occupy three bits in the MAC CE, and the second indication information may occupy one bit in the MAC CE. For another example, as shown in FIG. 25(*a*) and FIG. 25(*b*), when the first indication information is carried in the MAC CE of the MAC PDU, and the second indication information is carried in the MAC subheader of the MAC PDU, the first indication information may occupy three bits in the MAC CE, and the second indication information may occupy one bit in the MAC subheader. FIG. 25(*a*) is a schematic diagram in which the first indication information is carried in a MAC CE, and FIG. 25(*b*) is a schematic diagram in which the second indication information is carried in a MAC subheader. It should be noted that a specific quantity of bits occupied by the first indication information and a specific quantity of bits occupied by the second indication information are not limited in this application. To ensure that a length of the MAC CE is in a unit of a byte (eight bits), a remaining bit may be a reserved bit, a padding bit, or another information bit.

In an optional implementation, the first message may be RRC signaling, for example, a broadcast message or an RRC dedicated message.

In an optional implementation, the first message may be DCI, and the first message may be carried on a PDCCH.

Step 1802: If the first message indicates the wake-up time information of the terminal device, the terminal device wakes up based on the time information; or if the first message indicates the sleep time information of the terminal device, the terminal device sleeps based on the time information.

That the terminal device wakes up may be understood as that the terminal device needs to monitor a PDCCH, and that the terminal device goes to sleep may be understood as that the terminal device does not need to monitor a PDCCH. It should be noted that a state generated before the terminal device wakes up or goes to sleep is not limited in this application. For example, when the terminal device is awake, if the first message indicates the wake-up time information of the terminal device, the terminal device continues to awake; or if the first message indicates the sleep time information of the terminal device, the terminal device switches from a wake-up state to a sleep state. For another example, when the terminal device sleeps, if the first message indicates the wake-up time information of the terminal device, the terminal device switches from a sleep state to a wake-up state; or if the first message indicates the sleep time information of the terminal device, the terminal device continues to sleep.

In an optional implementation, when the time information is the time length in which the terminal device keeps awake or sleeping, that the terminal device wakes up based on the time information may be understood as that a time in which the terminal device wakes up and keeps awake is a time length in which the terminal device keeps awake and that corresponds to the time information; and that the terminal device sleeps based on the time information may be understood as that a time in which the terminal device goes to sleep and keeps sleeping is a time length in which the terminal device sleeps and that corresponds to the time information. Specifically, for the time point at which the terminal device starts to wake up or go to sleep, refer to the related descriptions in step 1801, and repeated parts are not described herein again.

In another optional implementation, when the time information is the time length before the terminal device wakes up or goes to sleep, that the terminal device wakes up based on the time information may alternatively be understood as that the terminal device is awake and starts to wake up after a wake-up time length of the terminal device that corresponds to the time information; and that the terminal device sleeps based on the time information may alternatively be understood as that the terminal device sleeps and starts to sleep after a sleep time length of the terminal device that corresponds to the time information.

In an optional implementation, when the time information is the time at which wake-up or sleep of the terminal device ends, that the terminal device wakes up based on the time information may be understood as that the terminal device wakes up and keeps awake until the end of a wake-up time point of the terminal device that corresponds to the time information; and that the terminal device sleeps based on the time information may be understood as that the terminal device sleeps and keeps sleeping until the end of a sleep time point of the terminal device that corresponds to the time information. Specifically, for the time at which the terminal device starts to wake up or go to sleep, refer to the related descriptions in step 1801, and repeated parts are not described herein again.

In an optional implementation, when the first message is DCI, after the terminal device receives the first message from the communications device, the terminal device does not start or restart an activity timer InactivityTimer. Specifically, in the prior art, when the terminal device receives DCI (a PDCCH) indicating new transmission, the terminal device needs to start or restart InactivityTimer, so as to receive subsequently scheduled data. However, in this implementation, because the first message is not directly related to data scheduling, the terminal device does not need to start or restart InactivityTimer.

In a specific implementation, in addition to indicating wake-up or sleep event information of the terminal device, the first message may further have another indication function. For example, the first message may further indicate new transmission. When the first message is DCI indicating new transmission, the terminal device does not start or restart InactivityTimer after the terminal device receives the first message from the communications device.

In an optional implementation, if the first message indicates the sleep time information of the terminal device, and an activity timer is running, the terminal device stops the activity timer, or the terminal device stops and resets the activity timer. For example, that the terminal device stops the activity timer may be: The terminal device stops InactivityTimer when (or after) receiving the first message; or the terminal device stops InactivityTimer when a next DRX cycle of a (current) DRX cycle starts. For example, the (current) DXR cycle is a DRX cycle in which a time of receiving the first message is located, and the start of the next DRX cycle means a start location of "On Duration" of the next DRX cycle. It should be noted that both a (current) cycle and a next cycle in the embodiment shown in FIG. 18 of this application may be understood as the foregoing descriptions, and repeated parts are not described again below. For example, that the terminal device resets the activity timer may be: The terminal device sets a value of InactivityTimer to an initial value (for example, 0). In this way, when InactivityTimer needs to be started next time, InactivityTimer may be enabled to start timing from 0, to avoid affecting a normal procedure.

In an optional implementation, if the first message indicates the sleep time information of the terminal device, and an on-duration timer onDurationTimer is running, the terminal device stops the on-duration timer, or the terminal device stops and resets the on-duration timer. For example, that the terminal device stops onDurationTimer may be specifically: The terminal device stops onDurationTimer when (or after) receiving the first message; or the terminal device stops onDurationTimer when a next DRX cycle of a (current) DRX cycle starts. For example, that the terminal device resets onDurationTimer may be specifically: The terminal device sets a value of onDurationTimer to an initial value (for example, 0). In this way, when onDurationTimer needs to be started next time, onDurationTimer may be enabled to start timing from 0, to avoid affecting a normal procedure.

In an optional implementation, if the first message indicates the sleep time information of the terminal device, and a retransmission timer RetransmissionTimer is running, the terminal device stops the retransmission timer, or the terminal device stops and resets the retransmission timer. In an optional implementation, RetransmissionTimer may be an uplink retransmission timer (RetransmissionTimer (uplink, UL)) and/or a downlink retransmission timer (RetransmissionTimer (downlink, DL)). RetransmissionTimer UL may also be denoted as drx-RetransmissionTimer UL, and RetransmissionTimer DL may also be denoted as drx-RetransmissionTimer DL. In this embodiment of this application, only RetransmissionTimer UL and RetransmissionTimer DL are used as examples for description. It should be understood that RetransmissionTimer UL may be replaced with drx-RetransmissionTimer UL, and RetransmissionTimer DL may be replaced with drx-RetransmissionTimer DL.

In an optional implementation, based on a specific status of RetransmissionTimer, if RetransmissionTimer is running, the terminal device may stop RetransmissionTimer specifically in the following three cases: For details, refer to Case b1, Case b2, and Case b3 in the embodiment shown in FIG. 7, and repeated parts are not described herein again.

For example, that the terminal device stops RetransmissionTimer may be specifically: The terminal device stops RetransmissionTimer when (or after) receiving the first message; or the terminal device sops RetransmissionTimer when a next DRX cycle of a (current) DRX cycle starts.

For example, that the terminal device resets RetransmissionTimer may be specifically: The terminal device sets a value of RetransmissionTimer to an initial value (for example, 0). In this way, when RetransmissionTimer needs to be started next time, RetransmissionTimer may be enabled to start timing from 0, to avoid affecting a normal procedure.

According to the state indication method for the terminal device that is provided in this embodiment of this application, the terminal device receives the first message from the communications device, where the first message indicates the wake-up or sleep time information of the terminal device. If the first message indicates the wake-up time information of the terminal device, the terminal device wakes up based on the time information; or if the first message indicates the sleep time information of the terminal device, the terminal device sleeps based on the time information. According to the foregoing method, the terminal device may flexibly wake up or sleep based on the first message. In addition, compared with the prior art, because the indication of the sleep time information of the terminal device is introduced, the terminal device can flexibly sleep, so that power consumption can be better reduced, thereby meeting a power consumption reduction requirement.

According to the foregoing embodiments, in an embodiment, the terminal device shown in FIG. 16 may be configured to perform the operations of the terminal device in the embodiment shown in FIG. 18. Examples are as follows.

The receiving unit 1601 is configured to receive a first message from a communications device, where the first message indicates wake-up or sleep time information of the terminal device. The processing unit 1602 is configured to: if the first message indicates the wake-up time information of the terminal device, wake up based on the time information; or if the first message indicates the sleep time information of the terminal device, sleep based on the time information.

In an optional implementation, the first indication information indicates the time information.

In an optional implementation, the first message includes second indication information, and the second indication information indicates the terminal device to wake up or go to sleep.

In an optional implementation, the time information is a time length in which the terminal device keeps awake or sleeping, or the time information is a time length before the terminal device wakes up or goes to sleep, or the time information is a time at which wake-up or sleep of the terminal device ends.

In an optional implementation, the time length is one or more milliseconds, one or more subframes, one or more slots, one or more discontinuous reception DRX cycles, one or more pieces of "On Duration", one or more paging occasions, one or more physical downlink control channel PDCCH monitoring occasions, a time length in a unit of a millisecond, a time length in a unit of a subframe, a time length in a unit of a slot, a time length in a unit of a discontinuous reception DRX cycle, a time length in a unit of an amount of "On Duration", a time length in a unit of a paging occasion, or a time length in a unit of a physical downlink control channel PDCCH monitoring occasion.

In an optional implementation, the first message is a MAC PDU or RRC signaling.

In an optional implementation, when the first message is a MAC PDU, and the first message includes the first indication information, the first indication information is carried in a medium access control subheader of the MAC PDU, or the first indication information is carried in a MAC CE of the MAC PDU.

In an optional implementation, when the first message is a MAC PDU, and the first message includes the second indication information, the second indication information is carried in a medium access control subheader of the MAC PDU, or the second indication information is carried in a MAC CE of the MAC PDU.

In an optional implementation, when the first message is a MAC PDU, and the first message includes the first indication information and the second indication information, the first indication information and the second indication information may be carried in the following manner: Both the first indication information and the second indication information are carried in a medium access control subheader of the MAC PDU; or both the first indication information and the second indication information are carried in a MAC CE of the MAC PDU; or the first indication information is carried in a medium access control subheader of the MAC PDU, and the second indication information is carried in a MAC CE of the MAC PDU; or the second indication information is carried in a medium access control subheader of the MAC PDU, and the first indication information is carried in a MAC CE of the MAC PDU.

In an optional implementation, the first message may be DCI.

In an optional implementation, when the first message is DCI, the processing unit 1602 is further configured to skip starting or restarting an activity timer.

In an optional implementation, if the first message indicates the sleep time information of the terminal device, and an activity timer is running, the processing unit 1602 is further configured to stop the activity timer, or the processing unit 1602 is further configured to stop and reset the activity timer.

In an optional implementation, if the first message indicates the sleep time information of the terminal device, and an on-duration timer is running, the processing unit 1602 is further configured to stop the on-duration timer, or the processing unit 1602 is further configured to stop and reset the on-duration timer.

In an optional implementation, if the first message indicates the sleep time information of the terminal device, and a retransmission timer is running, the processing unit 1602 is further configured to stop the retransmission timer, or the processing unit 1602 is further configured to stop and reset the retransmission timer.

According to the terminal device, the terminal device receives the first message from the communications device, where the first message indicates the wake-up or sleep time information of the terminal device. If the first message indicates the wake-up time information of the terminal device, the terminal device wakes up based on the time information; or if the first message indicates the sleep time information of the terminal device, the terminal device sleeps based on the time information. In this way, the terminal device may flexibly wake up or sleep based on the first message. In addition, compared with the prior art, because the indication of the sleep time information of the terminal device is introduced, the terminal device can flexibly sleep, so that power consumption can be better reduced, thereby meeting a power consumption reduction requirement.

According to the foregoing embodiments, in an embodiment, the terminal device shown in FIG. 17 may be further configured to perform the operations of the terminal device in the embodiment shown in FIG. 18. Examples are as follows.

According to an eighteenth aspect, this application further provides a terminal device. The terminal device includes a transceiver 1701, at least one memory, and at least one processor 1702.

The transceiver 1701 is configured to receive and send a signal or a message when being invoked by the processor 1702. The processor 1702 is configured to: control the transceiver 1701 to receive a first message from a communications device, where the first message indicates wake-up or sleep time information of the terminal device; and if the first message indicates the wake-up time information of the terminal device, wake up based on the time information; or if the first message indicates the sleep time information of the terminal device, sleep based on the time information.

In an optional implementation, the first indication information indicates the time information.

In an optional implementation, the first message includes second indication information, and the second indication information indicates the terminal device to wake up or go to sleep.

In an optional implementation, the time information is a time length in which the terminal device keeps awake or sleeping, or the time information is a time length before the terminal device wakes up or goes to sleep, or the time information is a time at which wake-up or sleep of the terminal device ends.

In an optional implementation, the time length is one or more milliseconds, one or more subframes, one or more slots, one or more discontinuous reception DRX cycles, one or more pieces of "On Duration", one or more paging occasions, one or more physical downlink control channel PDCCH monitoring occasions, a time length in a unit of a millisecond, a time length in a unit of a subframe, a time length in a unit of a slot, a time length in a unit of a discontinuous reception DRX cycle, a time length in a unit of an amount of "On Duration", a time length in a unit of a paging occasion, or a time length in a unit of a physical downlink control channel PDCCH monitoring occasion.

In an optional implementation, the first message is a MAC PDU or RRC signaling.

In an optional implementation, when the first message is a MAC PDU, and the first message includes the first indication information, the first indication information is carried in a medium access control subheader of the MAC PDU, or the first indication information is carried in a MAC CE of the MAC PDU.

In an optional implementation, when the first message is a MAC PDU, and the first message includes the second indication information, the second indication information is carried in a medium access control subheader of the MAC PDU, or the second indication information is carried in a MAC CE of the MAC PDU.

In an optional implementation, when the first message is a MAC PDU, and the first message includes the first indication information and the second indication information, the first indication information and the second indication information may be carried in the following manner: Both the first indication information and the second indication information are carried in a medium access control subheader of the MAC PDU; or both the first indication information and the second indication information are carried in a MAC CE of the MAC PDU; or the first indication information is carried in a medium access control subheader of the MAC PDU, and the second indication information is carried in a MAC CE of the MAC PDU; or the second indication information is carried in a medium access control subheader of the MAC PDU, and the first indication information is carried in a MAC CE of the MAC PDU.

In an optional implementation, the first message is DCI.

In an optional implementation, when the first message is DCI, the processor 1702 is further configured to skip starting or restarting an activity timer.

In an optional implementation, if the first message indicates the sleep time information of the terminal device, and an activity timer is running, the processor 1702 is further configured to stop the activity timer, or the processor 1702 is further configured to stop and reset the activity timer.

In an optional implementation, if the first message indicates the sleep time information of the terminal device, and an on-duration timer is running, the processor 1702 is further configured to stop the on-duration timer, or the processor 1702 is further configured to stop and reset the on-duration timer.

In an optional implementation, if the first message indicates the sleep time information of the terminal device, and a retransmission timer is running, the processor 1702 is further configured to stop the retransmission timer, or the processor 1702 is further configured to stop and reset the retransmission timer.

In an optional implementation, the memory 1703 is coupled to the processor 1702, and is configured to store a program and the like. Specifically, the program may include program code, and the program code includes a computer operation instruction. The memory 1703 may include a RAM, or may include a nonvolatile memory (non-volatile memory), for example, at least one magnetic disk memory. The processor 1702 executes the application program stored in the memory 1703, to implement the foregoing functions, so as to implement the state indication method for the terminal device shown in FIG. 18.

According to the terminal device, the terminal device receives the first message from the communications device, where the first message indicates the wake-up or sleep time information of the terminal device. If the first message indicates the wake-up time information of the terminal device, the terminal device wakes up based on the time information; or if the first message indicates the sleep time information of the terminal device, the terminal device sleeps based on the time information. In this way, the terminal device may flexibly wake up or sleep based on the first message. In addition, compared with the prior art, because the indication of the sleep time information of the terminal device is introduced, the terminal device can flexibly sleep, so that power consumption can be better reduced, thereby meeting a power consumption reduction requirement.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams. Obviously, a person skilled in the art can make various modifications and variations to the embodiments of this application without departing from the scope of the embodiments of this application. In this way, this application is intended to cover these modifications and variations made to the embodiments of this application, provided that they fall within the scope of the claims of this application and their equivalent technologies.

What is claimed is:

1. A sleep method for a terminal device, comprising:
   determining whether no wake-up indication signal is received within a preset time; and
   based on a determination that no wake-up indication signal is received within the preset time,
      stopping, by the terminal device, an activity timer when the activity timer is running, wherein the running of the activity timer starts in response to the terminal device receiving a physical downlink control channel (PDCCH); or
      stopping, by the terminal device, a retransmission timer when the retransmission timer is running, wherein the terminal device monitors the PDCCH in response to the retransmission timer running;
   wherein discontinuous reception (DRX) is configured for the terminal device.

2. The sleep method according to claim 1, wherein the method further comprises:
   receiving a go-to-sleep signal within the preset time; or
   skipping receipt of a wake-up signal within the preset time; or
   receiving an indication signal within the preset time, wherein the indication signal comprises go-to-sleep indication information.

3. The sleep method according to claim 1, wherein:
   the discontinuous reception (DRX) being configured for the terminal device comprises: configuring a DRX cycle for the terminal device; and
   the stopping of the activity timer comprises:
      stopping the activity timer when a next DRX cycle of a current DRX cycle starts.

4. The sleep method according to claim 1, wherein:
   the discontinuous reception (DRX) being configured for the terminal device comprises: configuring a DRX cycle for the terminal device; and
   the stopping of the retransmission timer comprises:
   stopping the retransmission timer when a next DRX cycle of a current DRX cycle starts.

5. The sleep method according to claim 1, further comprising:
   based on the determination that no wake-up indication signal is received within the preset time, stopping the activity timer and resetting the activity timer; or
   based on the determination that no wake-up indication signal is received within the preset time, stopping the retransmission timer and resetting the retransmission timer; or
   based on the determination that no wake-up indication signal is received within the preset time, stopping the activity timer and the retransmission timer, and resetting the activity timer and the retransmission timer.

6. The sleep method according to claim 1, wherein the retransmission timer is an uplink retransmission timer and/or a downlink retransmission timer.

7. The sleep method according to claim 1, further comprising:
   stopping the activity timer, and starting or restarting a short cycle timer when the terminal device receives no wake-up indication signal within the preset time, wherein the terminal device uses a short DRX cycle when the short cycle timer runs.

8. The sleep method according to claim 1, further comprising:
   stopping the activity timer, and using a long DRX cycle when the terminal device receives no wake-up indication signal within the preset time.

9. The sleep method according to claim 8, further comprising:
   stopping a short cycle timer, or stopping and resetting the short cycle timer, when the terminal device receives no wake-up indication signal within the preset time,
   wherein the terminal device uses a short DRX cycle when the short cycle timer runs.

10. The sleep method according to claim 1, wherein the wake-up indication signal is a physical layer sequence, downlink control information (DCI), a medium access control control element (MAC CE), or a medium access control protocol data unit (MAC PDU).

11. The sleep method according to claim 10, further comprising:
    skipping starting or restarting the activity timer when the wake-up indication signal is downlink control information DCI.

12. The sleep method according to claim 1, further comprising:
    stopping the on-duration timer based on the determination that no wake-up indication signal is received within the preset time, or
    stopping and resetting the on-duration timer based on the determination that no wake-up indication signal is received within the preset time.

13. The sleep method according to claim 1, wherein the preset time is:
    a time point at which an On Duration in a DRX cycle starts or a time point within the On Duration in the DRX cycle; or
    a time period that is the On Duration in the DRX cycle.

14. A terminal device, comprising a processor coupled to a memory, the memory is configured to store instructions which upon execution by the processor such that the terminal device is at least configured to:
    determine whether no wake-up indication signal is received within a preset time; and
    based on a determination that no wake-up indication signal is received within the preset time,
       stop an activity timer when the activity timer is running, wherein the running of the activity timer starts when the terminal device receives a physical downlink control channel (PDCCH); or
       stop a retransmission timer when the retransmission timer is running, wherein the terminal device monitors the PDCCH when the retransmission timer runs;
    wherein discontinuous reception (DRX) is configured for the terminal device.

15. The terminal device according to claim 14, wherein the preset time is:
    a time point at which an On Duration in a DRX cycle starts or a time point within the On Duration in the DRX cycle; or
    a time period that is the On Duration in the DRX cycle.

* * * * *